US009797373B2

(12) United States Patent
Aihara et al.

(10) Patent No.: US 9,797,373 B2
(45) Date of Patent: Oct. 24, 2017

(54) BLADE, WIND TURBINE AND WIND POWER GENERATING SYSTEM

(71) Applicant: Technology of natural providence, Inc, Tokyo (JP)

(72) Inventors: Kunihiko Aihara, Tokyo (JP); Junko Aihara, Tokyo (JP)

(73) Assignee: TECHNOLOGY OF NATURAL PROVIDENCE, INC, Tokyo (JP)

( * ) Notice: Subject to any disclaimer, the term of this patent is extended or adjusted under 35 U.S.C. 154(b) by 764 days.

(21) Appl. No.: 14/182,490

(22) Filed: Feb. 18, 2014

(65) Prior Publication Data

US 2014/0234120 A1 Aug. 21, 2014

Related U.S. Application Data

(60) Provisional application No. 61/766,638, filed on Feb. 19, 2013.

(51) Int. Cl.
*F03D 3/06* (2006.01)

(52) U.S. Cl.
CPC .............. *F03D 3/061* (2013.01); *F03D 3/065* (2013.01); *F05B 2240/212* (2013.01); *Y02E 10/74* (2013.01)

(58) Field of Classification Search
CPC ......... F03D 3/061; F03D 3/065; Y02E 10/74; F05B 2240/212
See application file for complete search history.

(56) References Cited

U.S. PATENT DOCUMENTS

| 4,115,032 A | * | 9/1978 | Lange | ................... F03D 3/065 416/197 A |
| 7,896,609 B2 | * | 3/2011 | Mitchell | ................ F03D 3/005 415/4.2 |

FOREIGN PATENT DOCUMENTS

JP        2006-46306 A       2/2006

OTHER PUBLICATIONS

Machine Translation of Matsuzuno (JP2006-046306); Feb. 2006.*

* cited by examiner

*Primary Examiner* — Ryan J Walters
(74) *Attorney, Agent, or Firm* — Enshan Hong; VLP Law Group LLP

(57) ABSTRACT

A blade comprises a first blade surface, a second blade surface forming the reverse surface of the first blade surface, a front edge portion connected to the front end of the first blade surface and the front end of the second blade surface and formed in a curved shape convex toward the travelling direction, and a back edge portion connected to the back end of the first blade surface and the back end of the second blade surface extending toward the opposite of the travelling direction, and formed in an acute angle, and the blade is formed to be curved in an arc viewed from the side of the travelling direction.

7 Claims, 27 Drawing Sheets

A—A

A—A

A-A

A-A

A-A

A-A

BLADE, WIND TURBINE AND WIND POWER GENERATING SYSTEM

CROSS-REFERENCE TO RELATED APPLICATION

This application claims the benefit of U.S. Provisional Application No. 61/766,638, filed on Feb. 19, 2013, the entire disclosure of which is incorporated by reference herein.

FIELD

The present invention relates to a blade, a wind turbine, and a wind power generating system.

BACKGROUND

Various wind power generating system that utilizes the rotative force of a wind turbine and generate electric power have been proposed. For example, Patent Literature 1 discloses a lift force type wind turbine for wind-power generation in which three wing-type blades are arranged around and in parallel with a vertical rotating shaft.

However, the lift force type wind turbine described in the Unexamined Japanese Patent Application Kokai Publication No. 2006-46306 has an issue of low conversion efficiency for converting wind energy to rotational energy of a wind turbine.

SUMMARY

The present invention is made in view of the above issue, and an object of the present invention is to provide a blade, a wind turbine, and a wind power generating system which can efficiently convert the wind energy to rotational energy of a wind turbine.

In order to achieve the above-mentioned purpose, a blade according to a first aspect of the present invention advances toward a travelling direction using a lift force generated by the wind, the blade comprising:

a first blade surface;

a second blade surface forming the reverse surface of the first blade surface;

a front edge portion connected to the front end of the first blade surface and the front end of the second blade surface and formed in a curved shape convex toward the travelling direction; and a back edge portion connected to the back end of the first blade surface and the back end of the second blade surface, extending toward the opposite of the travelling direction, and formed in an acute angle; and wherein the blade is formed to be curved in an arc viewed from the side of the travelling direction.

Viewing from the travelling direction, the blade may be formed in the shape of a semicircle so that the length along the travelling direction from each of both ends toward the center becomes gradually longer.

A concave portion which is concave toward the second blade surface is arranged on the first blade surface, and a wall surface of the concave portion on the side of the travelling direction is formed in the shape of a curved surface, the wall surface being concave toward the travelling direction.

A step is formed on the first blade surface so that the distance between the surface of the step on the front edge portion side and the second blade surface is greater than the distance between the surface of the step on the back edge portion side and the second blade surface;

wherein a surface of the step that connects the surface of the step on the front edge portion side and the surface of the step on the back edge portion side is facing the back edge portion side.

The surface of the step may be formed on the concaved surface being concave toward the front edge portion.

A back edge plate extending to the opposite side of the front edge portion may be arranged on the surface of the back edge portion on the first blade surface side.

A wind turbine according to a second aspect of the present invention is characterized in that the blade is arranged such that the blade is rotatable around the rotating shaft and the first blade surface is arranged facing the outside in the direction of radius of rotation.

A wind power generating system according to a third aspect of the present invention is characterized in that the wind power generating system comprises the wind turbine and a generating system that generates electricity by rotating the wind turbine.

According to the present invention, the wind energy can be efficiently converted to rotation energy of a wind turbine.

BRIEF DESCRIPTION OF THE DRAWINGS

A more complete understanding of this application can be obtained when the following detailed description is considered in conjunction with the following drawings, in which.

DETAILED DESCRIPTION

Below, a blade 10, wind turbine 20 and wind power generating system 30 according to the embodiments of the present invention are described in detail with reference to the drawings.

First Embodiment

Figure 1:
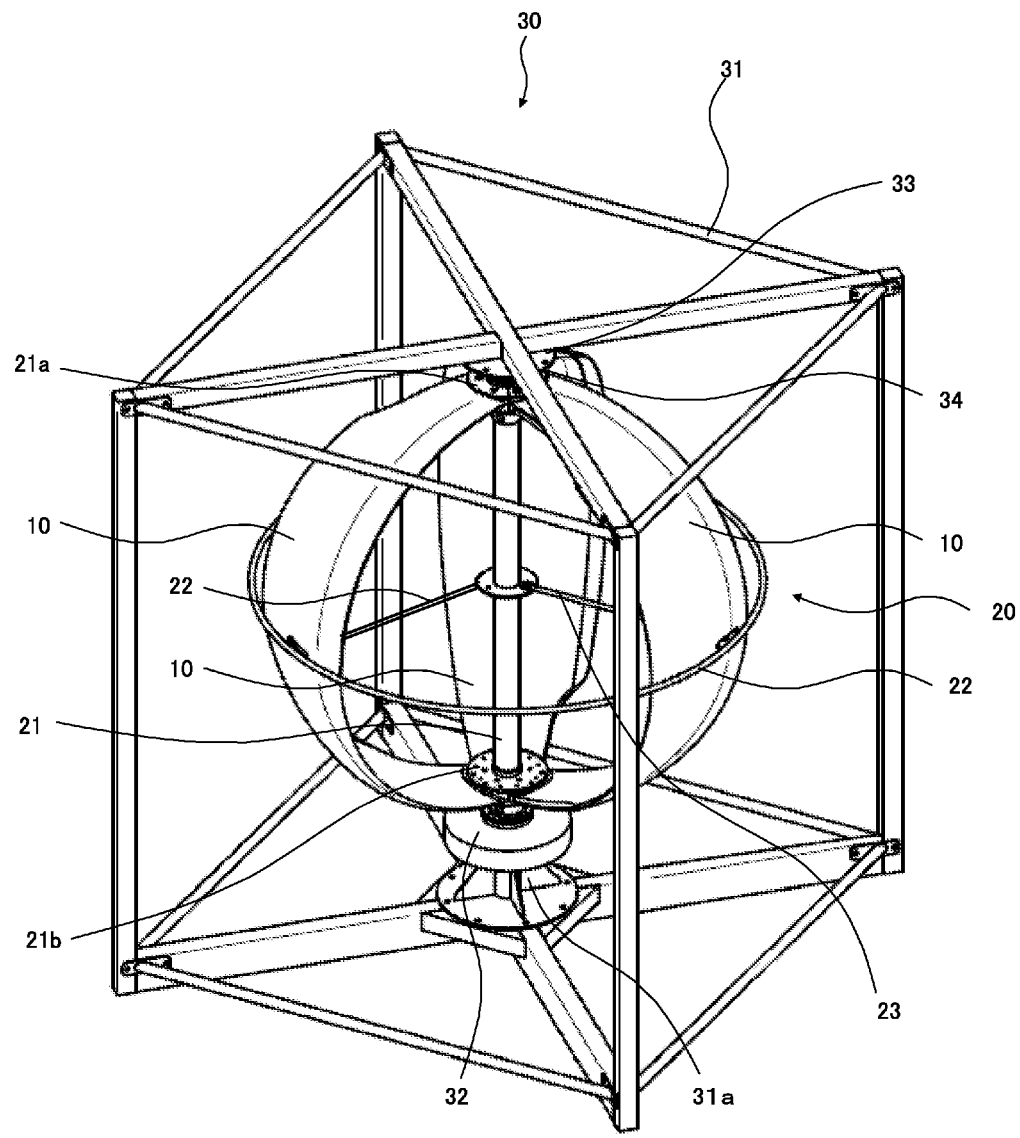
FIG. 1 shows an overall perspective view of a wind power generating system according to the first embodiment of the present invention.
Figure 2:
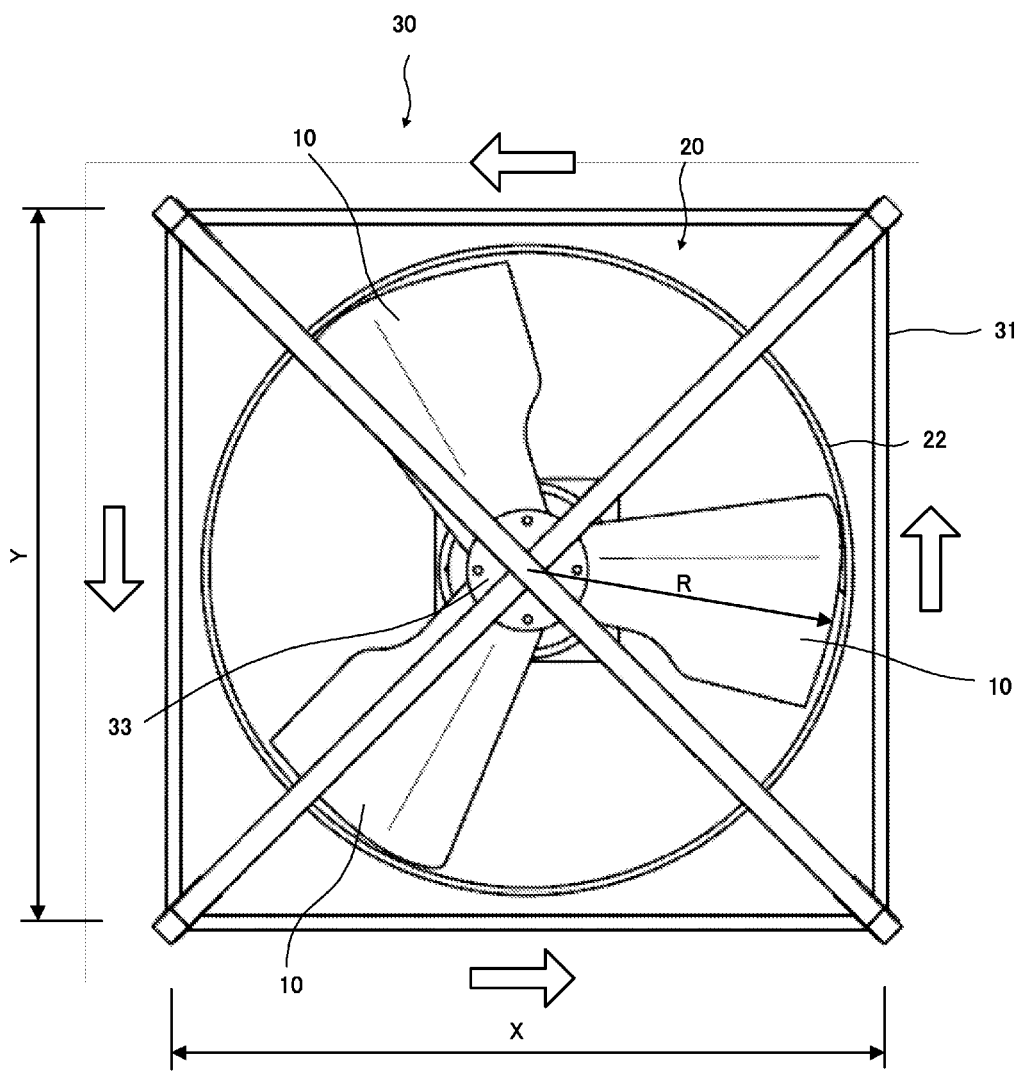
FIG. 2 shows a plan view showing the wind power generating system according to the first embodiment of the present invention.
Figure 3:
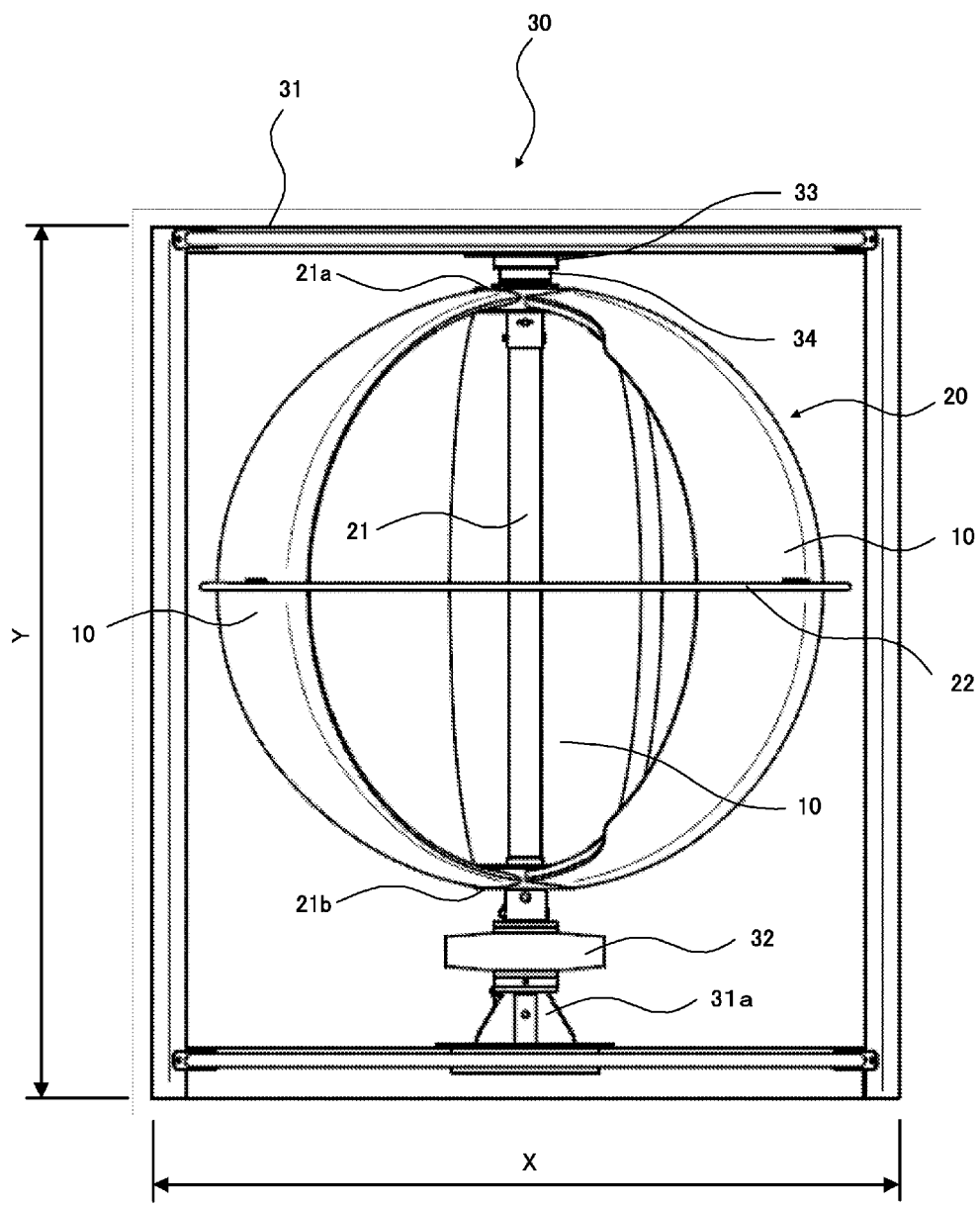
FIG. 3 shows a side view showing the wind power generating system according to the first embodiment of the present invention.

FIG. 1 is a overall perspective view of the wind power generating system 30, FIG. 2 is a planar view of the wind power generating system 30 as viewed from above, and FIG. 3 is a side view of the wind power generating system 30 as vied from a side. The wind power generating system 30 uses the rotational force of a wind turbine 20 that rotates under wind energy to generate electricity, and is provided with the wind turbine 20, a frame 31, a generator 32 and rotational bearings 33. The weight of the wind power generating system 30 is, for example, 66.3 kg.

The frame 31 is generally a frame formed into a right-angled parallelepiped and is configured, for example, by assembling metallic square pipesiron, aluminum or the like. The height Z of the frame 31 is, for example, 1,384 mm, and the width X and depth Y of the frame 31 are, for example, 1,180 mm, respectively. In addition, components, such as an angle, may be adopted as the component which constitutes the frame 31, and its material is not restricted to metals.

On the bottom of the frame 31, square pipes are arranged so as to intersect in a cross shape, and the generator 32 is secured on a base 31a arranged on top of that intersection.

On the top of the frame 31, square pipes are arranged intersecting in an x-shape so as to connect opposite corners of the top surface, and the bearings 33 and an electromagnetic brake 34 are mounted on the underside surface of this intersection. The top end of the rotating shaft 21 is inserted into the bearings 33 and the electromagnetic brake 34.

The bearings 33 supports rotatably the top end of the rotating shaft 21 of the wind turbine 20.

The electromagnetic brake 34 comprises a disk (not shown) integrally formed with the rotating shaft 21 of the wind turbine 20 and a shoe (not shown) formed separately from the rotating shaft 21. While the disk rotates with the wind turbine 20 when the wind turbine 20 rotates, the shoe is kept in a static state. The shoe is supported by the main body of the electromagnetic brake 34 to freely project and retract in the direction toward the disk. Projection and retraction of the shoe is performed by an electromagnet (not shown) disposed in the electromagnetic brake 34. The shoe abuts on the disk in an projected state when the coil of the electromagnet is energized. The braking force of the electromagnetic brake 34 is set up small as compared with the rotatory inertia force of the wind turbine 20, and even if the shoe abut on the disk, the wind turbine 20 is not stopped suddenly, but simply the speed of the wind turbine 20 is slowed down. This can prevent the wind turbine 20 from being damaged by rotating too fast, for example, in a high wind velocity range. As the blade 10 is a lift force type, the rotary torque of the wind turbine 20 is small as compared with a drag type blade. Thus, the electromagnetic brake 34 may be comparatively inexpensive, small and/or a small capacity type.

The generator 32 is composed of a stator (not shown) and a rotor (not shown) having magnetic poles supported so as to be rotatably with respect to the stator. The stator is secured to the bottom surface of the frame 31, while the rotor is connected to the bottom edge of the rotating shaft 21 of the wind turbine 20.

The wind turbine 20 is positioned in the frame 31 of the wind power generating system 30, is centered about the axis of the rotating shaft 21 and is free to rotate such that the rotating shaft 21 is perpendicular with respect to the bottom surface and top surface of the frame 31. The wind turbine 20 is provided with the rotating shaft 21, ring 22, three spokes 23 and three blades 10.

Elongated round bars are bent and connected to form a circle to be the ring 22. The spokes 23 are straight and elongated round bars. As shown in FIG. 1, the ring 22 is connected to the rotating shaft 21 via three spokes 23 extending radially from the rotating shaft 21. Each spoke 23 penetrates around the central portion of the blades 10. Each blade 10 is arranged in a state in which a below-described first blade surface 11 (refer to FIGS. 4-6) faces the outside in the direction of the radius of rotation. The central portion of each blade 10 is connected to the inner surface of the ring 22. Each top end and bottom end of each blade 10 are connected to a hub 21a and a hub 21b which are disposed at the top end and the bottom end of the rotating shaft 21. The radius R of the wind turbine 20 is, for example, 500 mm, adopting an external surface standard of the blades 10.

As shown in FIG. 2, when the wind turbine 20 is viewed from the top side of the rotating shaft 21 in the axis direction, the three blades 10 are each arranged equiangularly at every 120 degrees. The three blades 10 are positioned such that a front edge portion 13 (refer to FIGS. 4 and 6) faces in the counterclockwise direction, centered about the axis of the rotating shaft 21. The wind turbine 20 is configured so as to rotate in the counterclockwise direction as indicated by white arrows in FIG. 2, and this is described in more detail below. The weight of the wind turbine 20 is, for example, 18.4 kg.

Each end of the blades 10 are connected to the hub 21a and hub 21b which are disposed at the top end and the bottom end of the rotating shaft 21 by, for example, bolts and nuts.

Next, the detailed configuration of the blades 10 will be explained with reference to FIGS. 4-7. The blade 10 has a first blade surface 11, a second blade surface 12, a front edge portion 13, and a back edge portion 14. The blade 10 is made of fiber reinforced plastics (FRP), for example, and an outside member positioned outside of the rotational direction and an inside member positioned inside of the outside member are configured to be combined to form blades 10 to be hollow inside. The weight of the main body of each blade 10 is, for example, 1.1 kg. A wing spar may be reinforced inside the blades 10 and the blades 10 may be formed solid filled with resin or the like.

Figure 6:
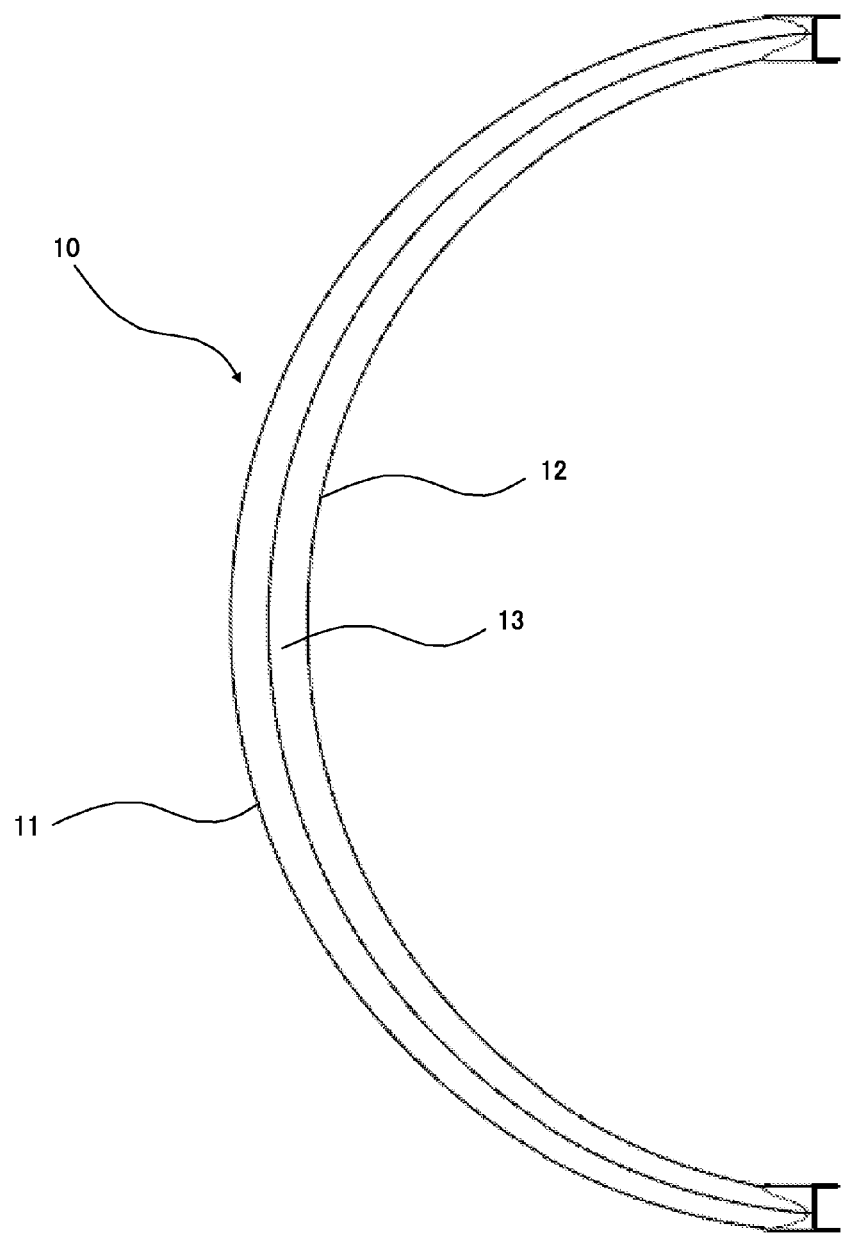
FIG. 6 shows a diagram of a blade according to the first embodiment of the present invention viewed from a side of a front edge portion.

As shown in FIG. 6, viewed from the side of the front edge portion 13, the blades 10 are curved to form in an arc which substantially forms a semicircle. A radius R of the first blade surface 11 is 500 mm, for example. The length L of the blade 10 along the travelling direction (the length in the left-right direction in FIG. 7) is formed so that the length becomes gradually longer toward a center, hence the central part has the maximum length (for example, 334 mm). In this way, the blades 10 form substantially a moon shape (shape of a portion defined by two great circles on a spherical surface). The thickness T of the blade 10 is, for example, 50 mm (the length in the top-bottom direction of the front edge portion in FIG. 7)

Figure 7:
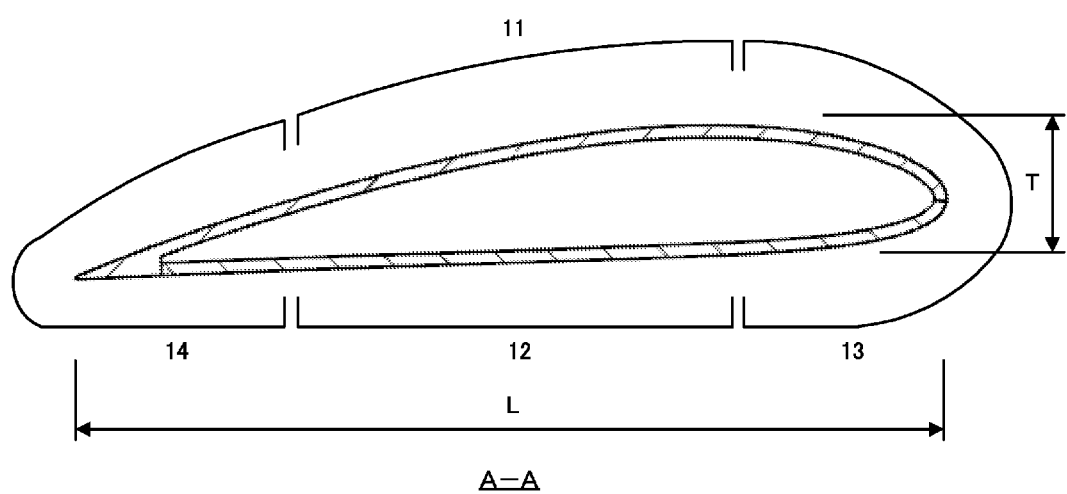
FIG. 7 shows a sectional view of the blade according to the first embodiment viewed from a direction A-A shown in FIG. 4.

As shown in FIG. 7, the front edge portion 13 has a streamlined shape cross section as a result of having a curved surface convex toward the outside of the blades 10, with the curvature of the front end being highest. The back edge portion 14 has a sharp V shape, and extends along the travelling direction to the opposite side of the travelling direction of the blades 10.

The first blade surface 11 is formed in a gently curved surface convex toward the opposite side of the second blade surface 12. On the other hand, the second blade surface 12 is formed substantially flat.

Next, the air flow around the blades 10 and lift forces that act on the blades 10 are explained. In the following explanation, a direction from the front edge portion 13 toward the back edge portion 14 is referred to as a "forward flow direction" and a direction from the back edge portion 14 toward the front edge portion 13 is referred to as a "reverse flow direction". As described above, the wind power generating system 30 of this embodiment comprises three blades 10. However, to make the explanation simpler, the air flow around one blade 10 and lift forces that act on the one blade 10 are explained.

Figure 4:
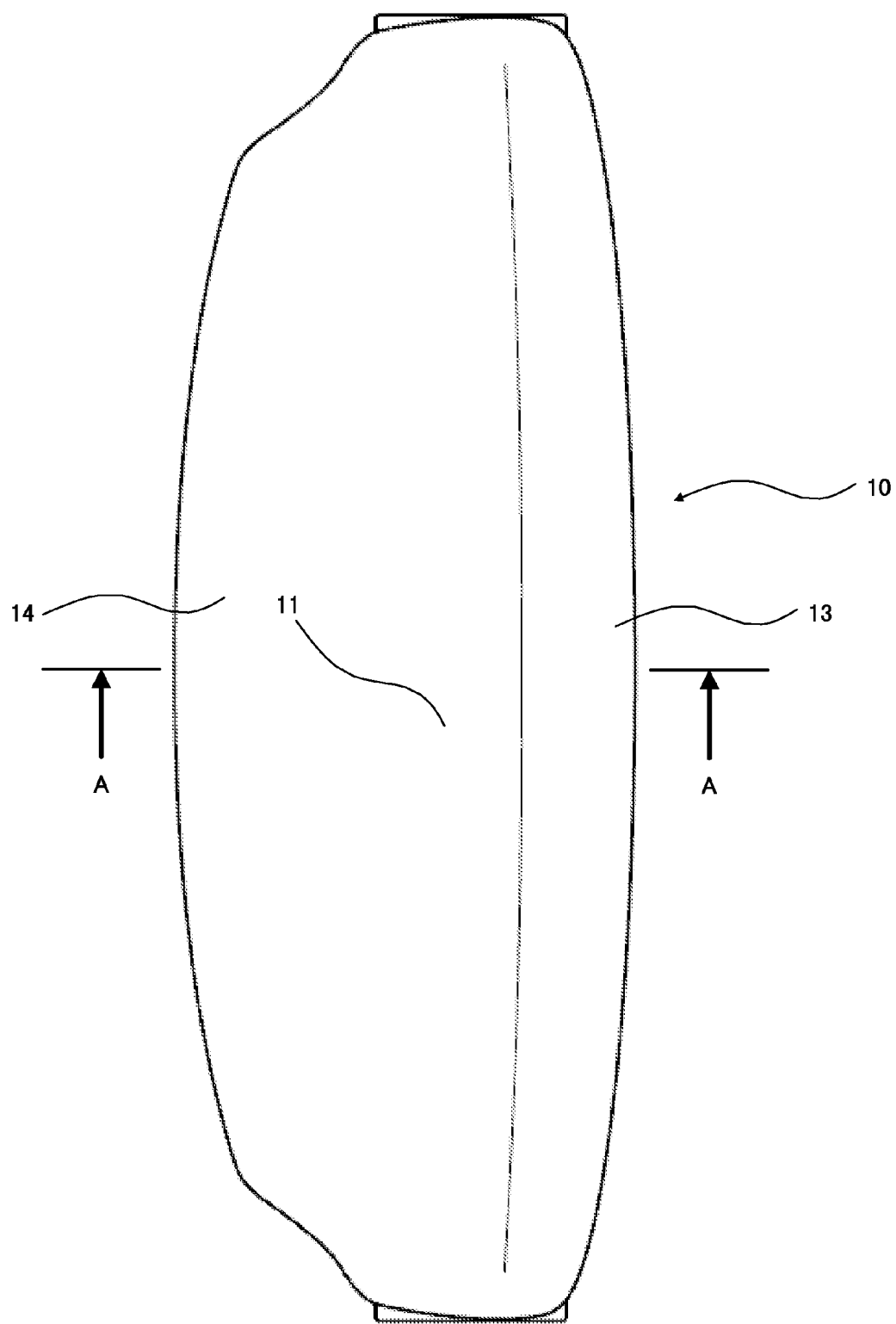
FIG. 4 shows a diagram of a blade according to the first embodiment of the present invention viewed from the side of the first blade surface.
Figure 5:
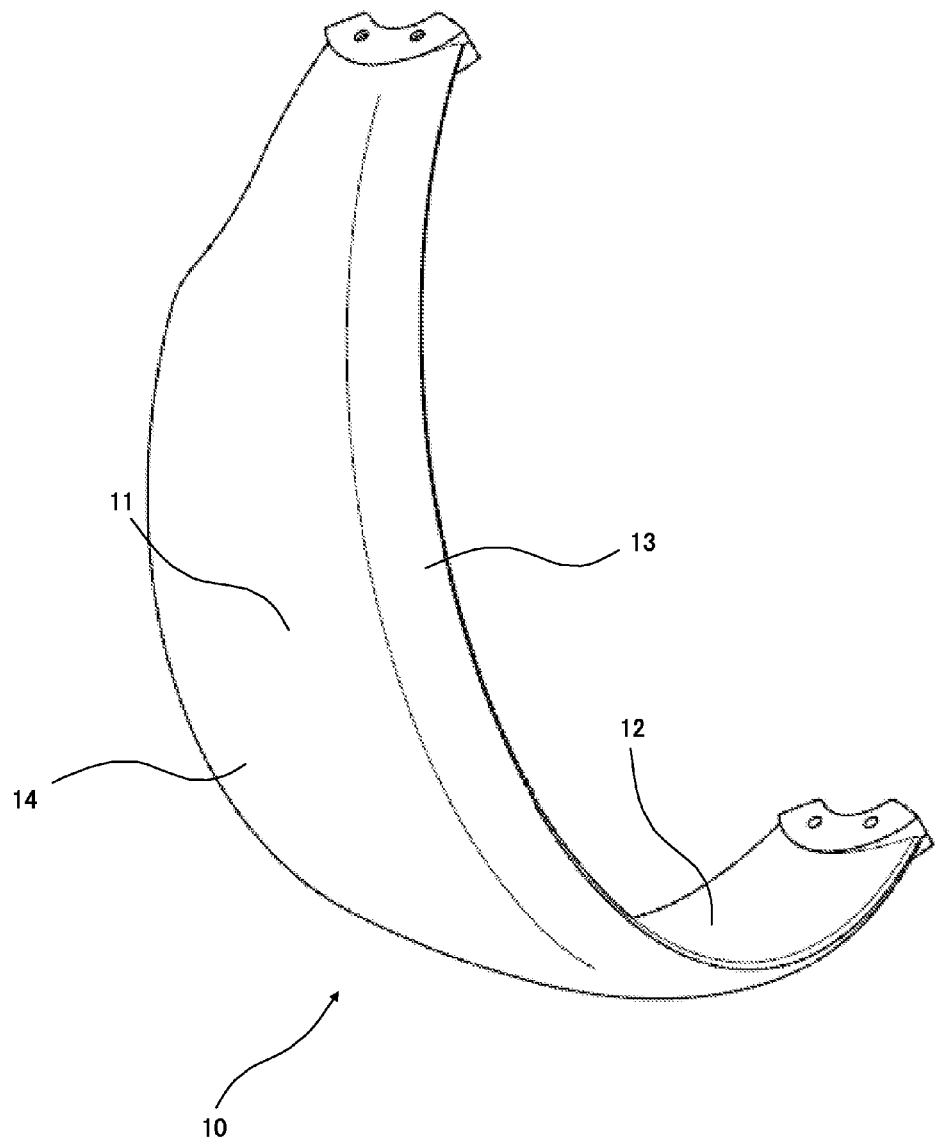
FIG. 5 shows a perspective view of the blade according to the first embodiment of the present invention.
Figure 8:
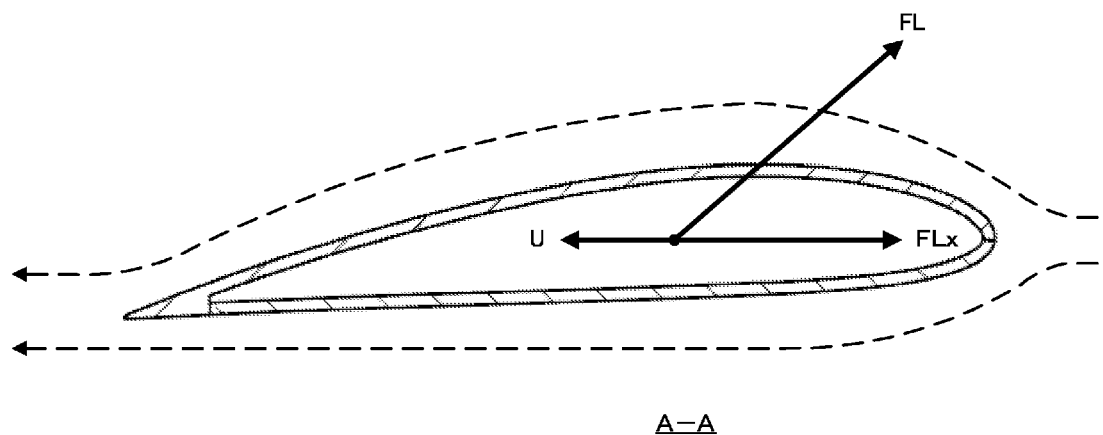
FIG. 8 is a diagram for explaining the lift force acting on the blade.

FIG. 8 is a sectional view of the blades 10 arranged along the air flow direction viewed from a line A-A in FIG. 4. If the wind blows in the reverse flow direction, the blades 10 receive drag from the wind toward the reverse flow direction. If the drag acts on the blades 10, the blades 10 advance in the reverse flow direction as a travelling direction, splitting the air flow with the front edge portion 13. The air split with the front edge portion 13 flows in the forward direction along the surface of the blades 10 (illustrated with a broken line in FIG. 7).

The distance of air flow along the first blade surface 11 is a little longer than the distance of air flow along the second blade surface 12. Due to the difference of the distances, the pressure on the side of the first blade surface 11 decreases, and the lift force FL directed to the upper right direction in FIG. 7 acts on the blades 10. The horizontal component FLx of the lift force FL acts towards the reverse flow direction, and the magnitude of FLx is larger than the air resistance U that acts in the forward flow direction. This generates driving force (=FLx−U) depending on the speed of the blades 10.

In the wind power generating system 30 configured as mentioned above, when the wind blows against the blades 10, drag acts on the blades 10 and the wind turbine 20 begins to rotate in the counterclockwise direction in FIG. 2, centered about the axis of the rotating shaft 21. If the wind turbine 20 rotates, the lift force having a magnitude depending on the speed of the blades 10 acts on the blades 10. The wind turbine 20 is rotated by the resultant force of the drag and the above-mentioned driving force.

Along with the rotation of the wind turbine 20, the rotor of a generator 32 integrated with the wind turbine 20 rotates and electric power is generated. The generated electric power is sent to a battery (not shown) and the like through an electric wire (not shown).

As mentioned above, according to the wind power generating system 30 of this embodiment, the blades 10 are formed to be curved. This can effectively convert wind energy to rotation energy to generate electricity compared with, for example, a wind power generating system comprising a perpendicular type wind turbine having the same air receiving area. As a result, even if small sized blades 10 or reduced number of blades 10 for the wind power generating system 30 can produce a planned power-generating capacity. Hence, size reduction of the wind power generating system 30 becomes possible.

A perpendicular type wind turbine is a wind turbine that has a plurality of linear blades being parallel to a vertical rotating shaft (blade whose horizontal cross section has a shape of a wing). The air receiving area in the wind power generating system according to this embodiment is an area encircled by the blades 10 viewing the wind turbine 20 from a direction perpendicular to the rotating shaft 21 (refer to FIG. 2), and is a substantially circular area. On the other hand, the air receiving area in a wind power generating system having a linear wing type wind turbine is an area sandwiched by opposing blades viewing the wind turbine from a direction perpendicular to the rotating shaft, and is a substantially rectangular area.

As the blades 10 are advanced toward a travelling direction using a lift force acting on the blades 10, the speed of advance of the blades 10 can be increased to be faster than wind velocity. That is, a peripheral speed ratio (advance speed of the blades 10/wind velocity) can be increased to larger than 1.

Curved formation of the blades 10 distribute stresses and stresses applied to particular portions are hard to be concentrated. The blades 10 are structurally strong preventing the blades 10 from damaging. Structural strength of the blades 10 can decrease the weight of the blades 10.

As the cross-sectional shape of the front edge portion 13 is formed in a streamlined shape in the travelling direction, the front edge portion 13 can control generation of turbulent flows around the front edge portion 13, and can control the air resistance acting on the blades 10.

Both ends of the blades 10 are secured to the rotating shaft 21 via the hubs 21a and 21b, respectively. This can suppress distortion, vibration and the like of the rotating shaft of the blades 10 due to the centrifugal force and the like at the time of rotation. As a result, the wind resistance strength of the blades 10 increases and even in a strong wind condition, the blades 10 are controlled not to be destroyed and the safety of the blades 10 are enhanced.

For example, metals and various kinds of resin or the like, not limited to FRP, may be adopted as materials for the blades 10. Use of insulating materials such as resin, carbon free FRP and/or the like for the blades 10, which hardly conduct electricity, can reduce breakage of the blades 10 due to lightening strikes.

Second Embodiment

Figure 9:
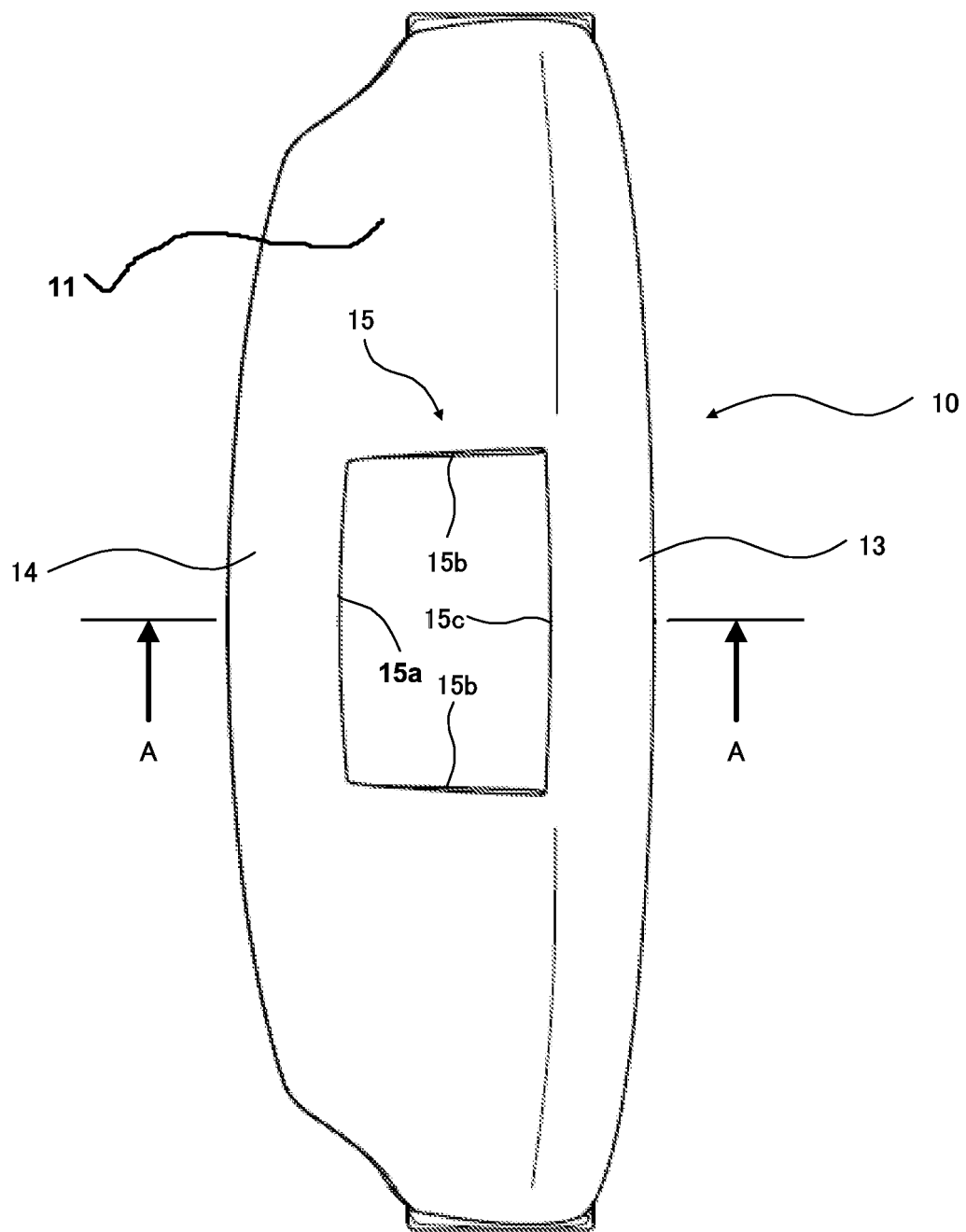
FIG. 9 shows a diagram of a blade according to the second embodiment of the present invention viewed from a side of the first blade surface.
Figure 10:
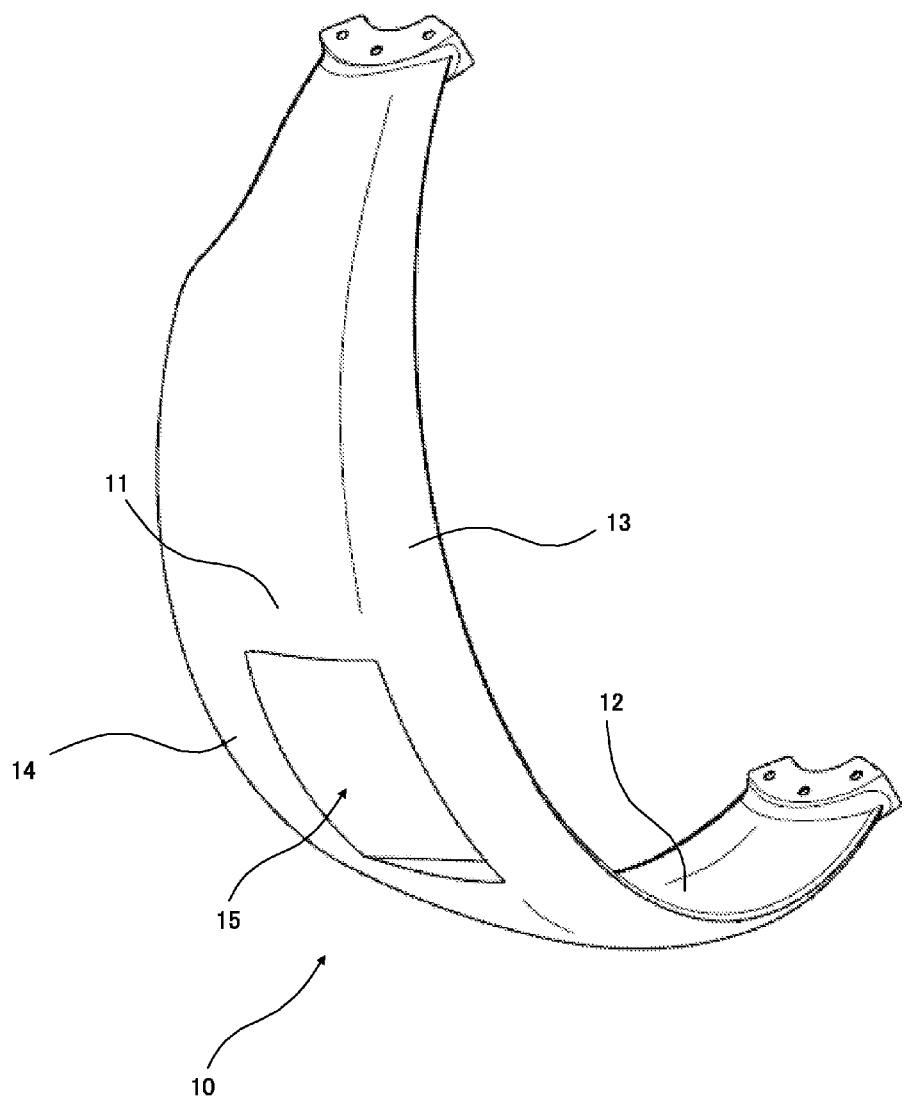
FIG. 10 shows a perspective view of the blade according to the second embodiment of the present invention.

Next, the wind power generating system 30 according to the second embodiment of the present invention is explained with reference to the FIGS. 9-11. In the wind power generating system 30 of this embodiment, the configuration of the blades 10 differs from that of the above-described first embodiment. Also regarding the wind power generating systems 30 of the third to fifth embodiments mentioned later, only the configurations of the blades 10 are different from that of the first embodiment mentioned above. In the explanation of the second to fifth embodiments, configurations that are the same as or equivalent to that of the first embodiment use the same reference numbers, and explanations of those configurations are omitted or abbreviated.

The configuration of the first blade surface 11 of the blades 10 according to this embodiment differs from the blades 10 of the first embodiment mentioned above. Other configurations, for example, configurations of the second blade surface 12, of the front edge portion 13, and of the back edge portion 14 are the same as the configuration of the blades 10 of the first embodiment mentioned above.

While the blades 10 according to the first embodiment mentioned above are a lift force type, the blades 10 according to this embodiment are a hybrid type which a lift force type and a drag type are combined. A specific configurational difference lies in that, while the first blade surface 11 of the blades 10 according to the first embodiment is formed in one smooth and curved surface, the blades 10 according to this embodiment have a wind receptor 15 in the center of the first blade surface 11.

The wind receptor 15 is a concave portion concave facing the second blade surface 12. As shown in FIG. 9, viewed from a side of the first blade surface 11, the wind receptor 15 is formed such that an edge of the wind receptor 15 on the front edge portion 13 side is a little bit longer than another edge of the wind receptor 15 on the back edge portion 14 side, the wind receptor 15 being formed in an approximately trapezoid symmetrical to the center of the top-bottom blade length direction. The edge length on the front edge portion 13 side is, for example, 274 mm, the edge length on the back edge portion 14 side is 250 mm, for example, and the distance of the two edges (length equivalent to the height of the trapezoid) is 157 mm, for example.

Figure 11:
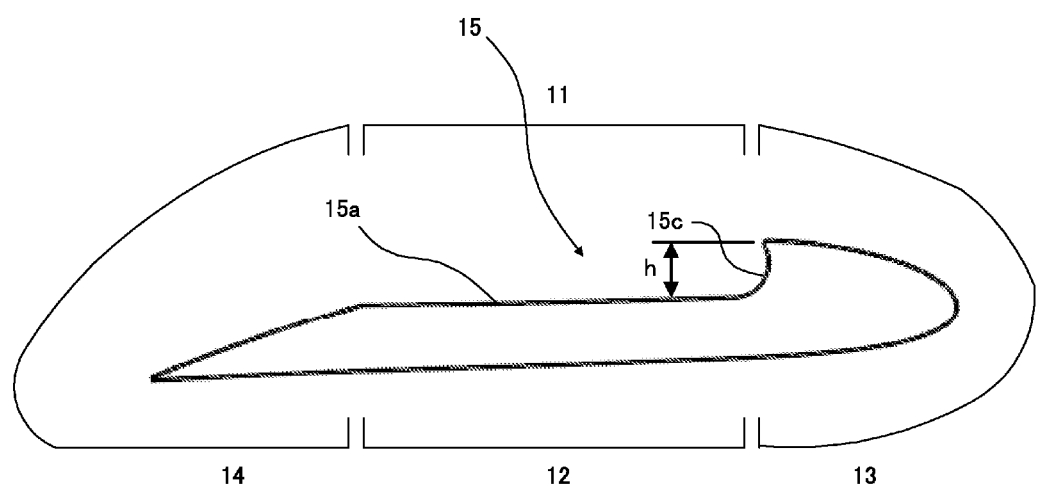
FIG. 11 shows a sectional view of the blade according to the second embodiment viewed from a direction A-A shown in FIG. 9.

The bottom surface 15a of the wind receptor 15 is almost parallel to the second blade surface 12, as shown in FIG. 11, and the side wall surfaces 15b, 15b along the travelling direction of the blade 10 are planes almost perpendicular the second blade surface 12. The front wall surface 15c on the side of the front edge portion 13 is formed in a concave surface facing the side of the back edge portion 14 and is slightly convex toward the side of the front edge portion 13. Height h of this wall surface 15c is 26 mm, for example.

When the wind blows from the reverse flow direction against the blades 10 according to this embodiment, the wind strikes against the front wall surface 15c of the wind receptor 15, and the blades 10 receive drag from the wind.

Due to the disposition of the wind receptor 15, the lift force received by the blades 10 is small, and the drag received by the blade 10 is large compared with the blades 10 according to the first embodiment mentioned above.

As a result, the starting characteristics in a low wind velocity range can be improved by adopting the blades 10 according to this embodiment rather than adopting the blades 10 according to the first embodiment. The blades 10 according to this embodiment can also prevent the rotational speed in a low wind velocity range or in a medium wind velocity range from being too fast.

Third Embodiment

Figure 12:
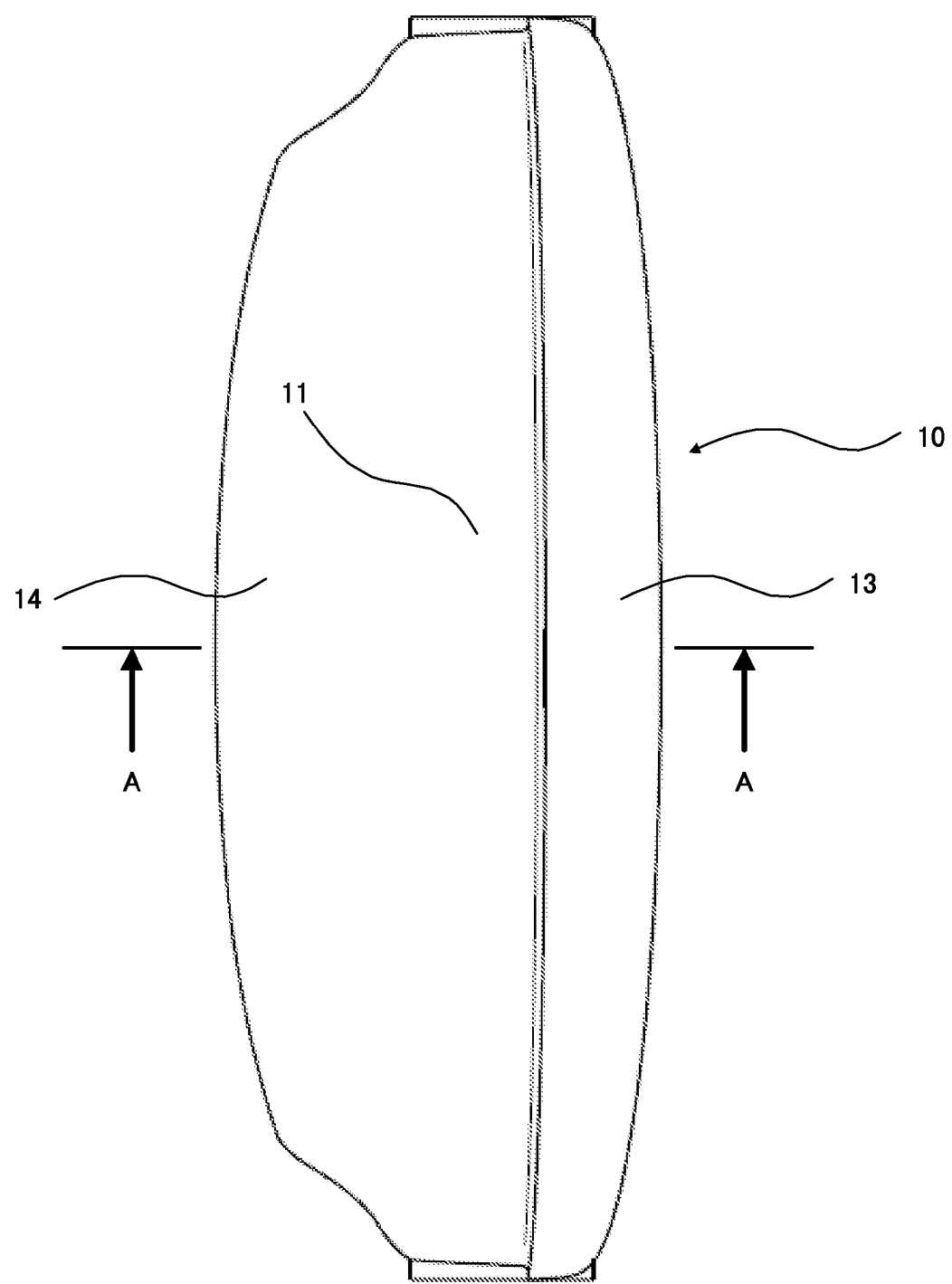
FIG. 12 shows a diagram of a blade according to the embodiment 3 of the present invention viewed from the side of the first blade surface.
Figure 13:
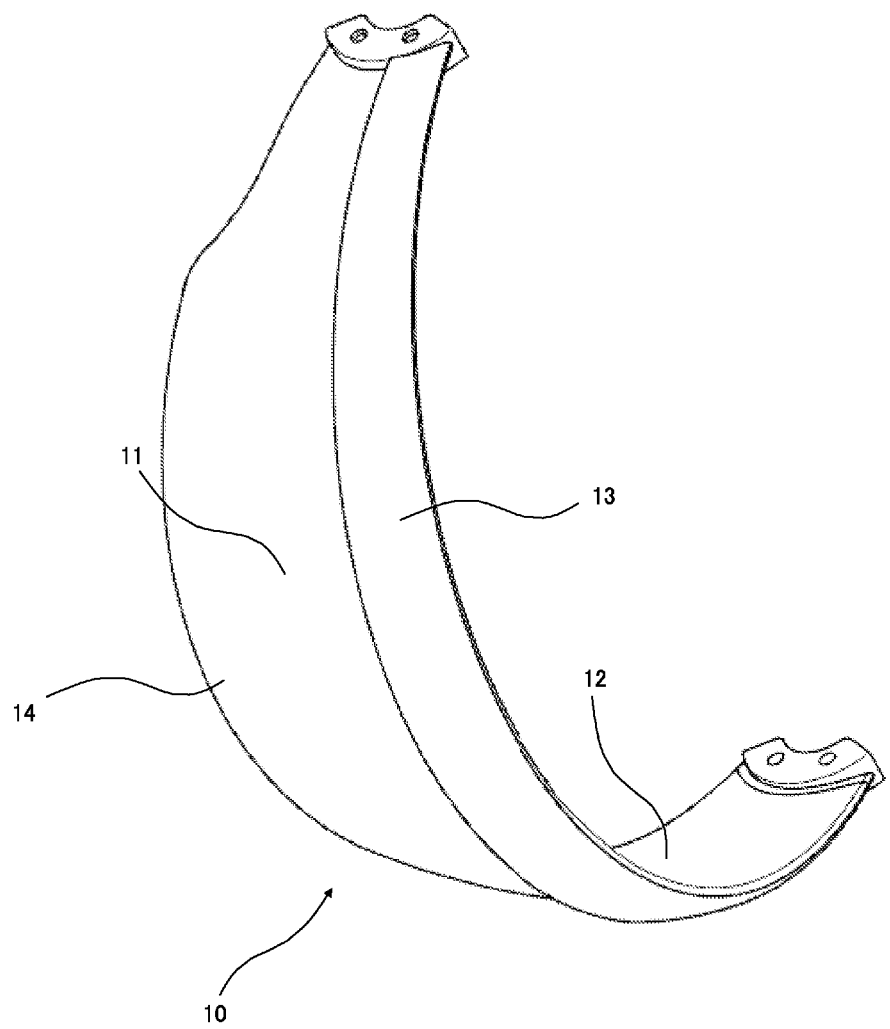
FIG. 13 shows a perspective view of the blade according to the embodiment 3 of the present invention.
Figure 14:
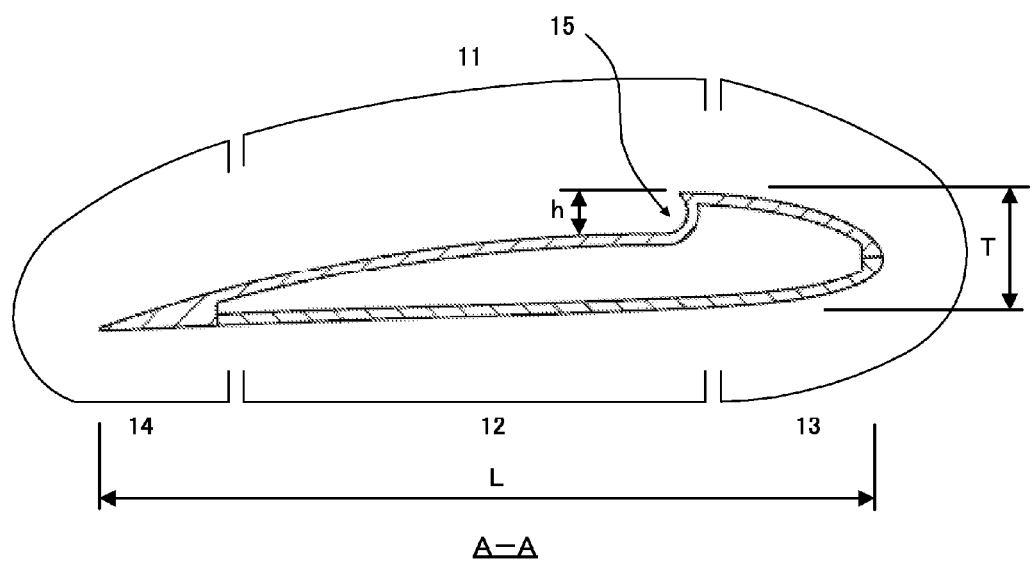
FIG. 14 shows a sectional view of the blade according to the embodiment 3 viewed from a direction A-A shown in FIG. 12.

Next, the wind power generating system 30 according to the third embodiment of the present invention is explained with reference to FIGS. 12-14. Similar to the blades 10 according to the second embodiment mentioned above, a wind receptor 15 is formed on the first blade surface 11 of the blades 10 according to this embodiment. However, the configuration of the wind receptor 15 according to this embodiment differs from the configuration of the second embodiment mentioned above. Other configurations, for example, configurations of the second blade surface 12, of the front edge portion 13, and of the back edge portion 14 are almost the same as those of blades 10 according to the first and second embodiments mentioned above.

A step facing the back edge portion 14 side is formed on the first blade surface 11 of the blades 10 according to this embodiment along the entire length of the blades 10 so that the distance between the surface of the step on the front edge portion 13 side and the second blade surface is greater than the distance between the surface of the step on the back edge portion 14 side and the second blade surface. A concave portion concave toward the front edge portion 13 side is formed on the surface of this step, and that concave portion is the wind receptor 15. A height h (refer to FIG. 14) of the wind receptor 15 along the section A-A shown in FIG. 12 is 17 mm, for example, which becomes smaller as the distance from the center toward the ends becomes longer. A thickness T of the blades 10 (top to bottom length of the front edge portion 13 in FIG. 14) is almost equal to those of the blades 10 according to the first and second embodiments mentioned above.

If a wind blows against the blades 10 according to this embodiment from a reverse flow direction, the wind strikes the wind receptor 15, which receives the drag from the wind. As the wind receptor 15 according to this embodiment is formed along the entire top to bottom length of the blade, being different from the blades 10 according to the second embodiment mentioned above, in the present embodiment, the wind receptor 15 has a large area and the blade receives large drag.

As a result, the starting characteristics in a low wind velocity range can be improved by adopting the blades 10 according to this embodiment rather than adopting the blades 10 according to the first embodiment. The blades 10 according to this embodiment can also prevent the rotational speed in a low wind velocity range or in a medium wind velocity range from being too fast.

Fourth Embodiment

Figure 15:
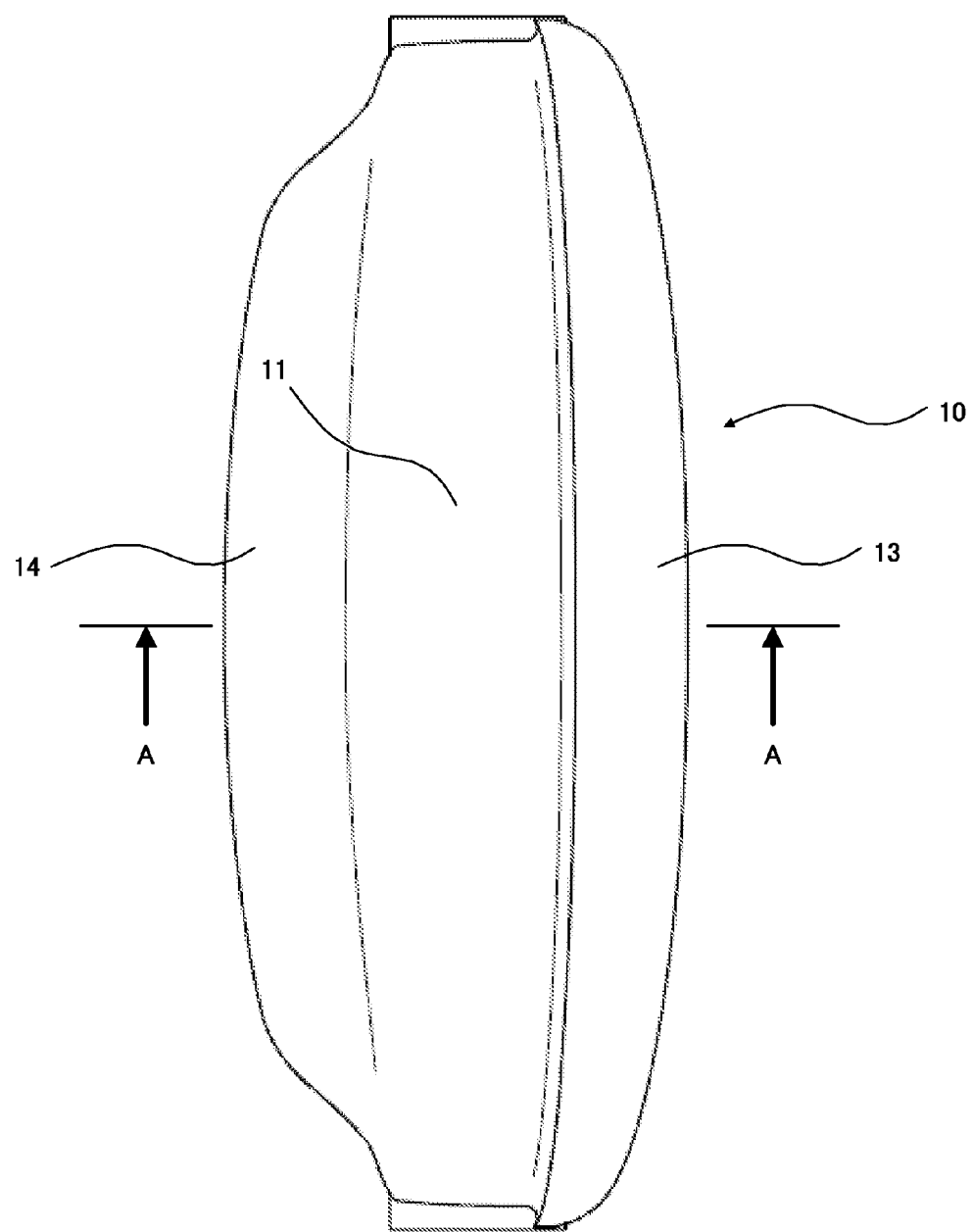
FIG. 15 shows a diagram of a blade according to the embodiment 4 of the present invention viewed from a side of the first blade surface.
Figure 16:
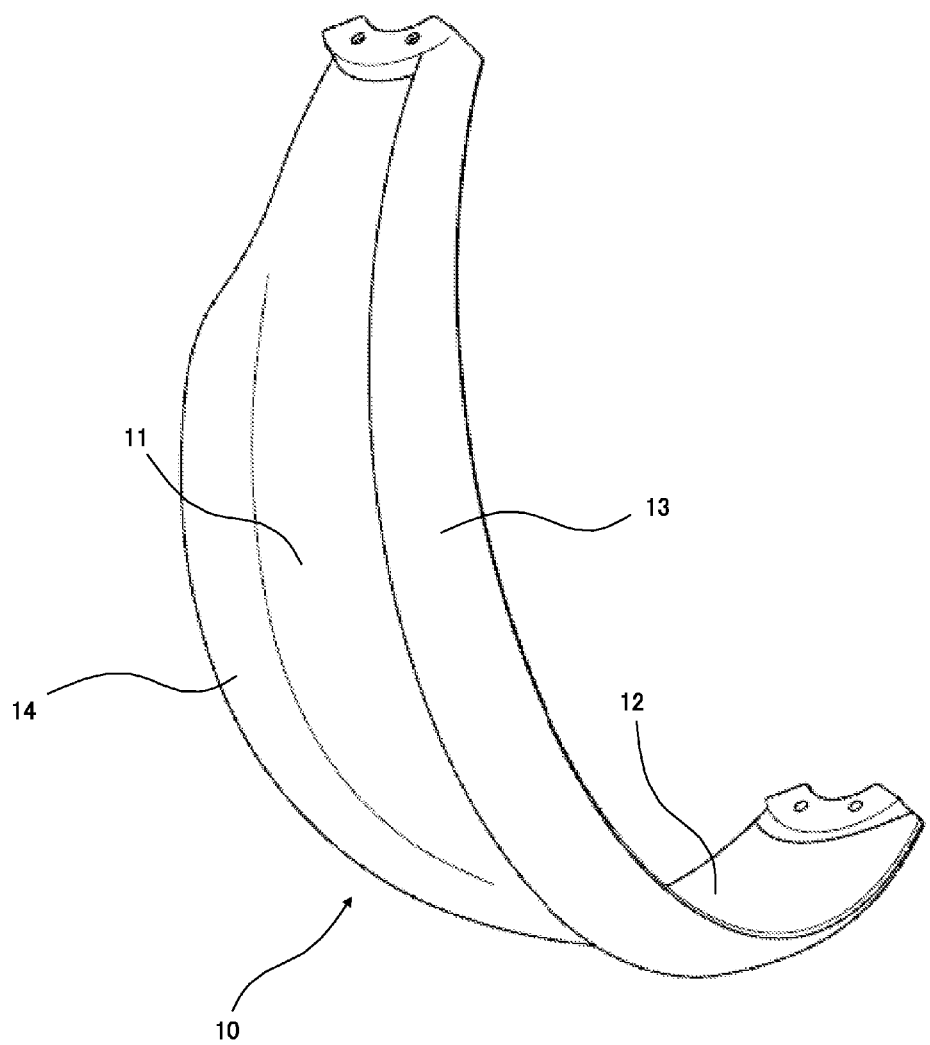
FIG. 16 shows a perspective view of the blade according to the embodiment 4 of the present invention.
Figure 17:
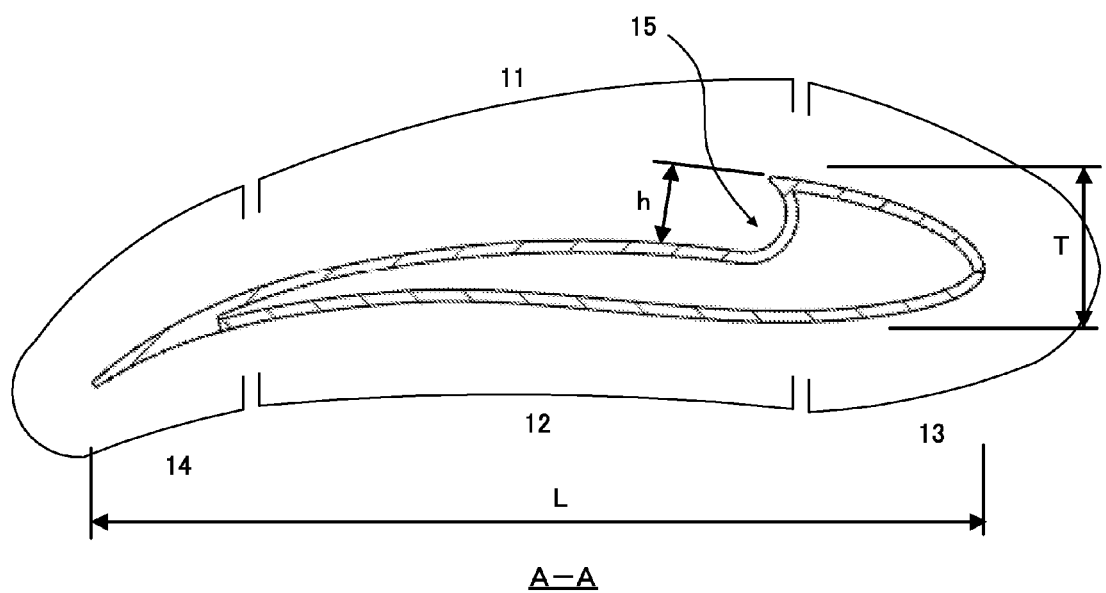
FIG. 17 shows a sectional view of the blade according to the embodiment 4 viewed from a direction A-A shown in FIG. 16.

Next, the wind power generating system 30 according to the fourth embodiment of the present invention is explained with reference to FIGS. 15-17. Also on the blades 10 according to this embodiment, the wind receptor 15 is formed on the first blade surface 11 similar to the blades 10 according to the second and third embodiments mentioned above. The configurations of the second blade surface 12 and the back edge portion 14 differ from those of the blades 10 according to the first to the third embodiments mentioned above. The configuration of the front edge portion 13 is almost the same as those of the blades 10 according to the first and second embodiments mentioned above.

A step facing the back edge portion 14 side is formed on the first blade surface 11 of the blades 10 according to this embodiment along the entire length of the blades 10 so that the distance between the surface of the step on the front edge portion 13 side and the second blade surface is greater than the distance between the surface of the step on the back edge portion 14 side and the second blade surface. A concave portion concave toward the front edge portion 13 side is formed on the surface of this step, and that concave portion is the wind receptor 15. A height h (refer to FIG. 15) of the wind receptor 15 along the section A-A shown in FIG. 15 is 33 mm, for example, which is a little bit higher than the height of the wind receptor 15 according to the second embodiment mentioned above and, which becomes smaller as the distance from the center toward the ends becomes longer.

The back edge portions 14 of the blades 10 according to the first to third embodiment mentioned above are formed almost straight along the second blade surface 12 and the back edge portion 14 in the travelling direction. On the other hand, a portion of the second blade surface 12 on the back edge portion 14 side and the back edge portion 14 of the blades 10 according to this embodiment are formed to be a contiguous surface curved concave toward the second blade surface 12 side.

If the wind blows against the blades 10 according to this embodiment from a reverse flow direction, the wind strikes the wind receptor 15 formed to have a concave surface, which receives the drag from the wind. If the blades 10 receive drag and travels in the forward direction in response to the drag, air flows along the surface of the second blade surface 12 in the forward flow direction, and the air strikes the surface of the back edge portion 14 on the second blade surface 12 side. As a result, turbulent flows are generated on the back edge portion 14 on the second blade surface 12 side. The higher the number of revolution N of the wind turbine 20 (speed of advance of the blades 10) becomes, the larger the turbulent flow becomes.

As a result, the starting characteristics in a low wind velocity range can be improved by adopting the blades 10 according to this embodiment rather than adopting the blades 10 according to the first embodiment. The blades 10 according to this embodiment can also prevent the rotational speed in a low wind velocity range or in a medium wind velocity range from being too fast.

Fifth Embodiment

Figure 18:
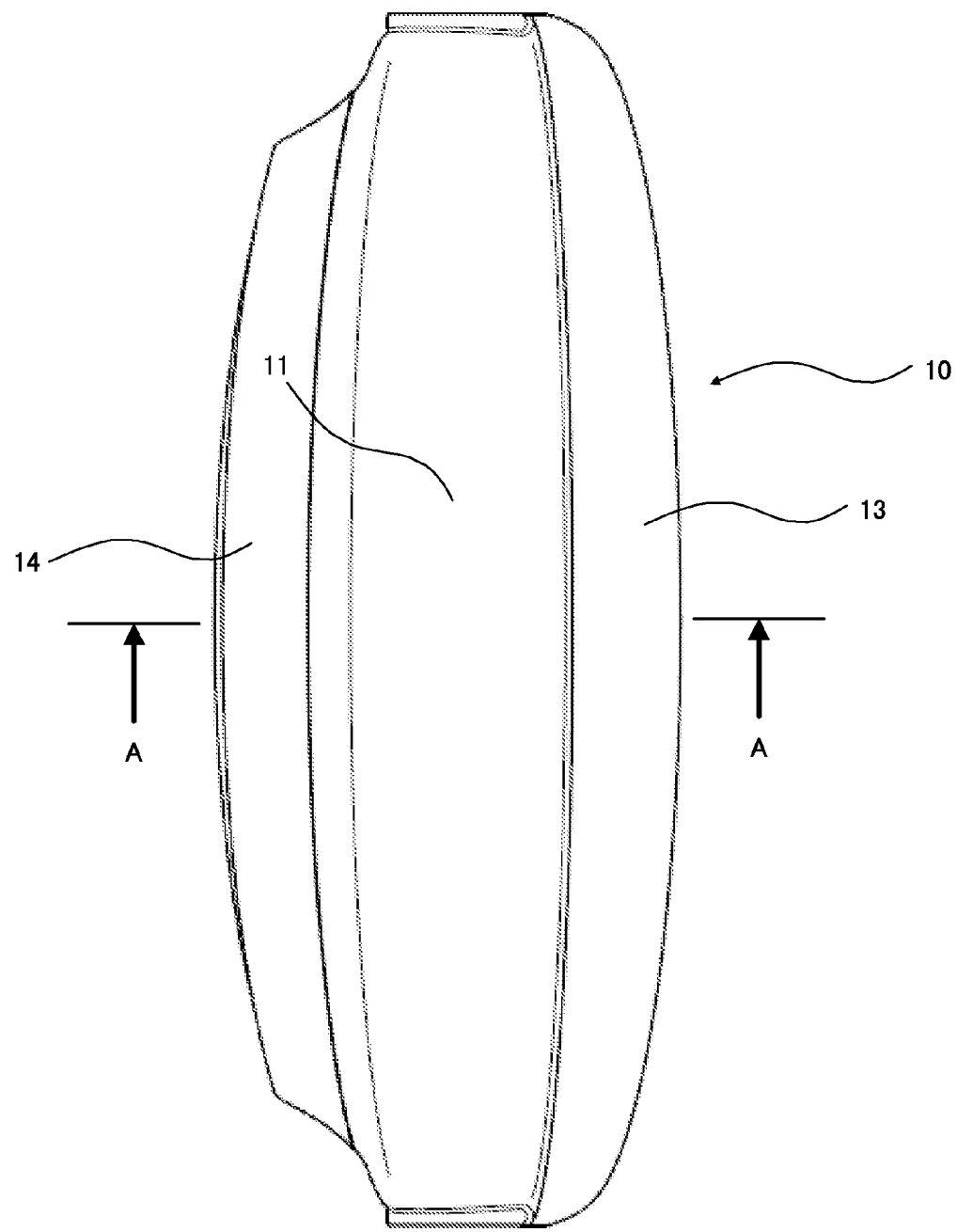
FIG. 18 shows a diagram of a blade according to the embodiment 5 of the present invention viewed from a side of the first blade surface.
Figure 19:
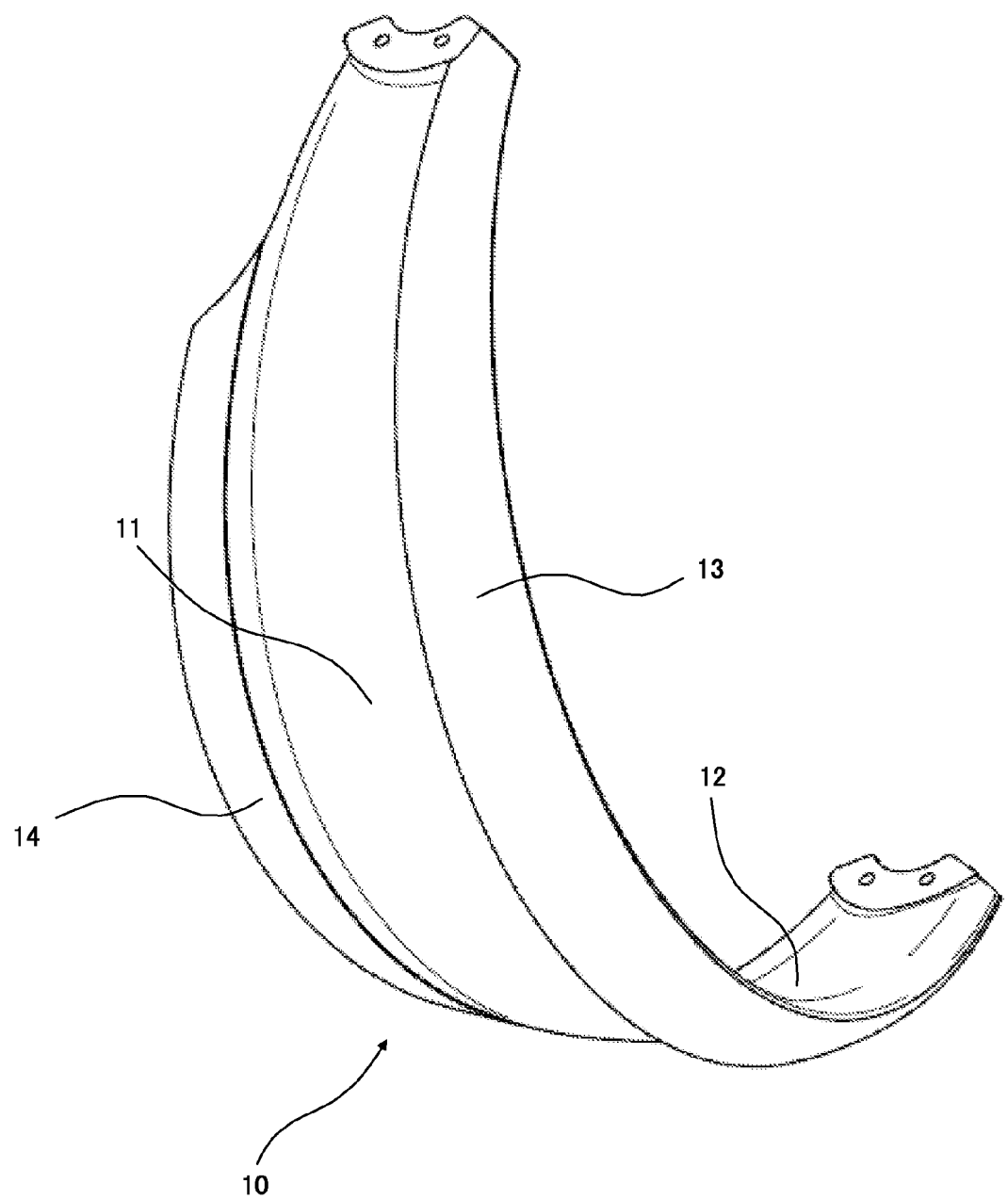
FIG. 19 shows a perspective view of the blade according to the embodiment 5 of the present invention.

Next, the wind power generating system 30 according to the fifth embodiment of the present invention is explained with reference to FIGS. 18-20. The configuration of only the back edge portion 14 of the blades 10 according to this embodiment is different from that of the blades 10 according to the fourth embodiment mentioned above.

Figure 20:
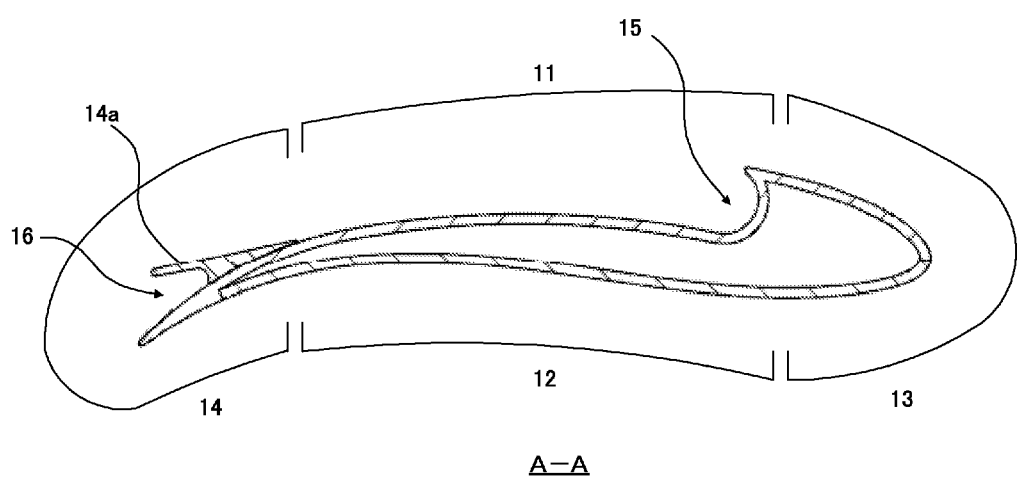
FIG. 20 shows a sectional view of the blade according to the embodiment 5 viewed from a direction A-A shown in FIG. 18.

As shown in FIG. 20, a back edge plate 14a extending straight to the opposite of the travelling direction of the blade 10 is arranged on the surface of the back edge portion 14 on the first blade surface 11 side. The upper surface of the first blade surface 11 and the upper surface of the back edge plate 14a form a substantially stepless, smooth and continuous surface. A portion sandwiched by the underside of the back edge plate 14a and the upper surface of the back edge portion 14 is concave facing the travelling direction side of the blade 10 and is a sub wind receptor 16 which is a roughly V shaped concave portion.

If the wind blows against the blades 10 according to this embodiment from a reverse flow direction, the wind strikes the wind receptor 15 and the sub wind receptor 16 which receive the drag from the wind. As the sub wind receptor 16 is provided, being different from the blades 10 according to the fourth embodiment mentioned above, the blades 10 receive large drag.

As a result, the starting characteristics in a low wind velocity range can be improved by adopting the blades 10 according to this embodiment rather than adopting the blades 10 according to the first embodiment. The blades 10 according to this embodiment can also prevent the rotational speed in a low wind velocity range or in a medium wind velocity range from being too fast.

Characteristics regarding the number of rotations of the sphere type wind turbines 20 according to the first to fifth embodiments are explained as compared with the characteristics regarding the number of rotations of a perpendicular type wind turbine which has perpendicular type blades. The air receiving area of the perpendicular type wind turbine used for this comparison is almost equal to the air receiving areas of the wind turbines 20 according to the above-mentioned first to fifth embodiments.

Figure 21:
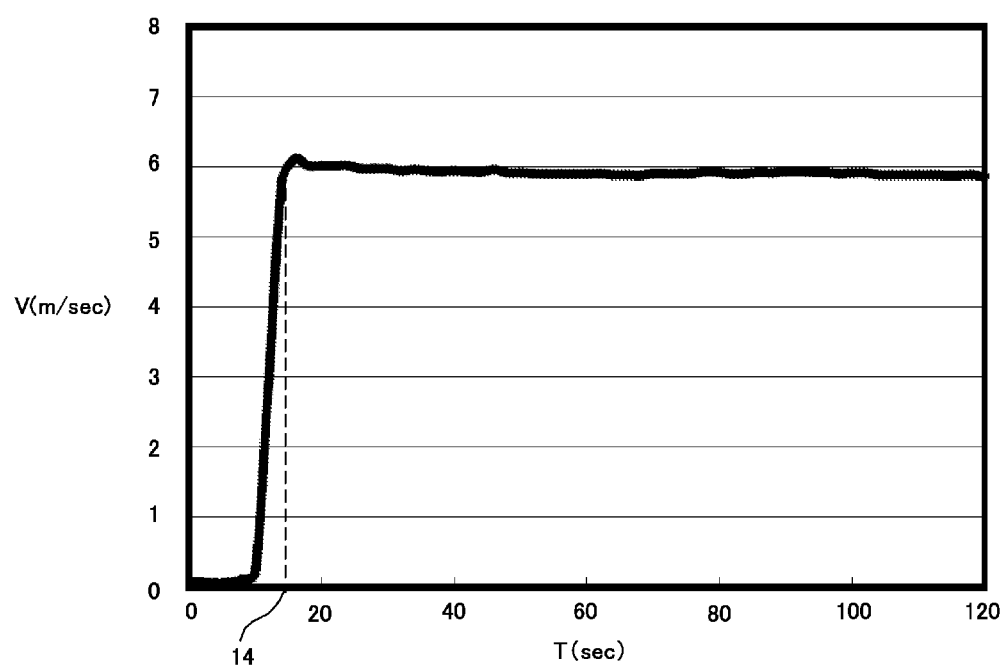
FIG. 21 is a graph illustrating changes of the wind velocity with passage of time.

FIG. 21 is a graph illustrating changes of the wind velocity V (m/s) with passage of time t (sec). As shown in the Figure, the wind velocity V is 0 (m/sec) at the time of a start (t=0). Then, the velocity increases to about 6 (m/sec) in about 14 (sec), then the velocity is constant at about 6 (m/sec) after 14 (sec).

Figure 22:
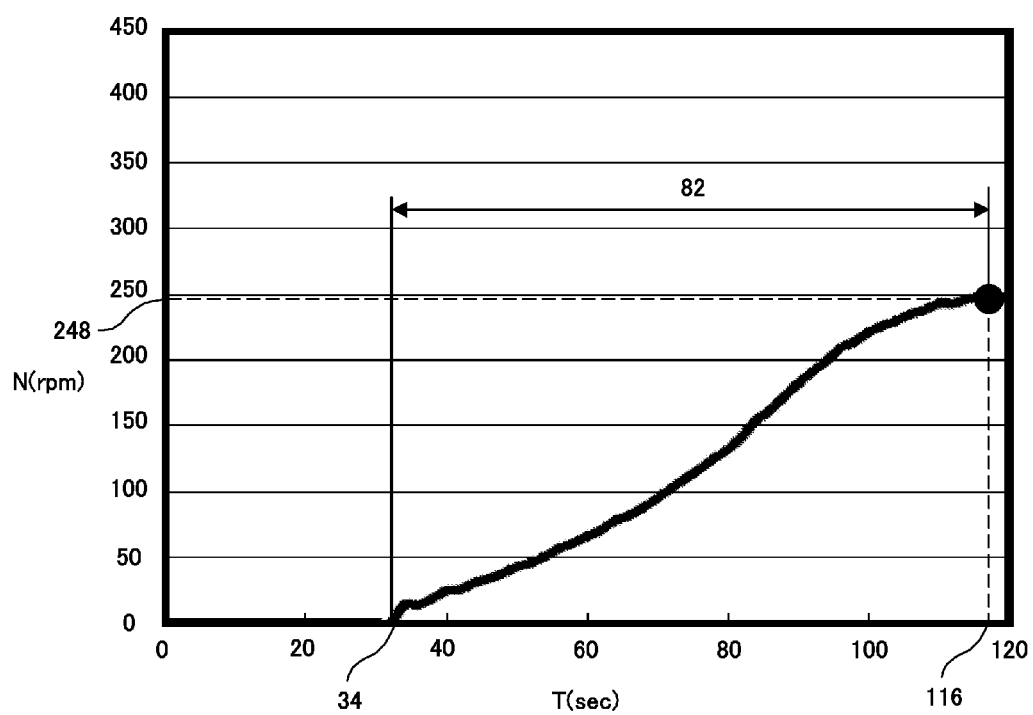
FIG. 22 is a graph showing changes of the number of rotations of a perpendicular type wind turbine with passage of time.
Figure 23:
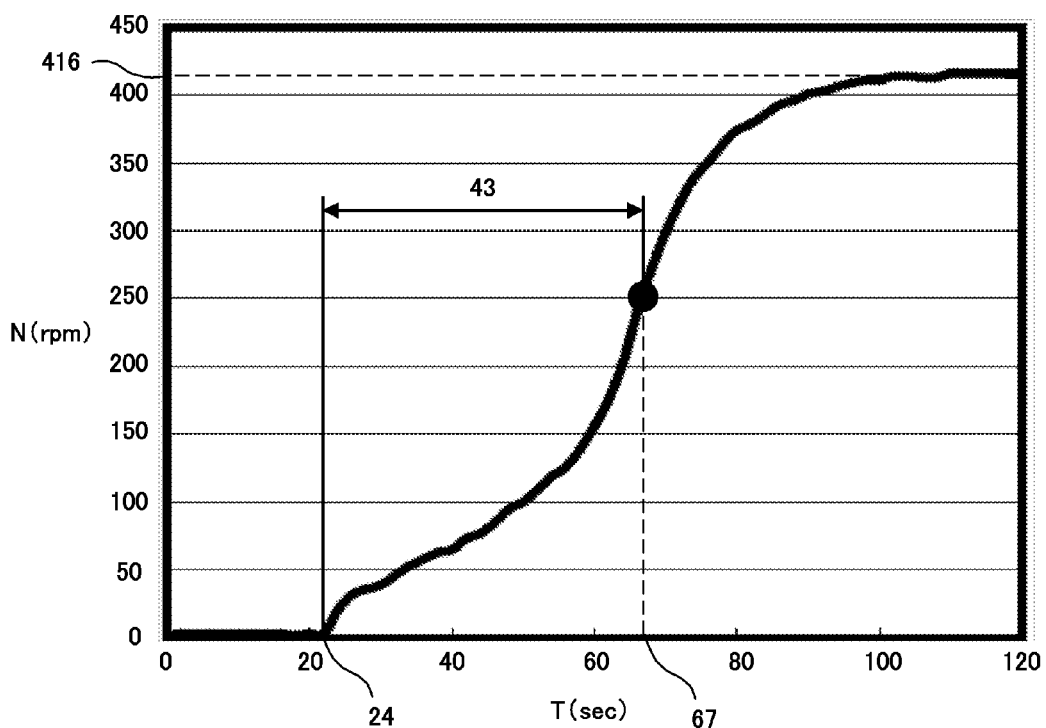
FIG. 23 is a graph showing changes over time of the number of rotations of the wind turbine according to the first embodiment of the present invention.
Figure 24:
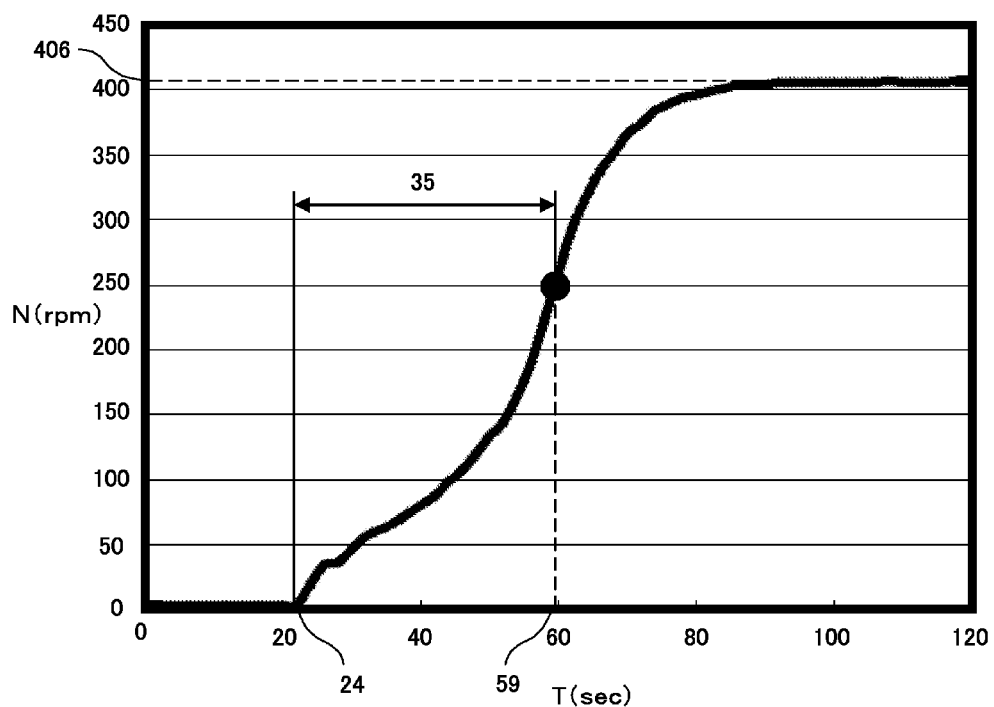
FIG. 24 is a graph showing changes over time of the number of rotations of the wind turbine according to the second embodiment of the present invention.
Figure 25:
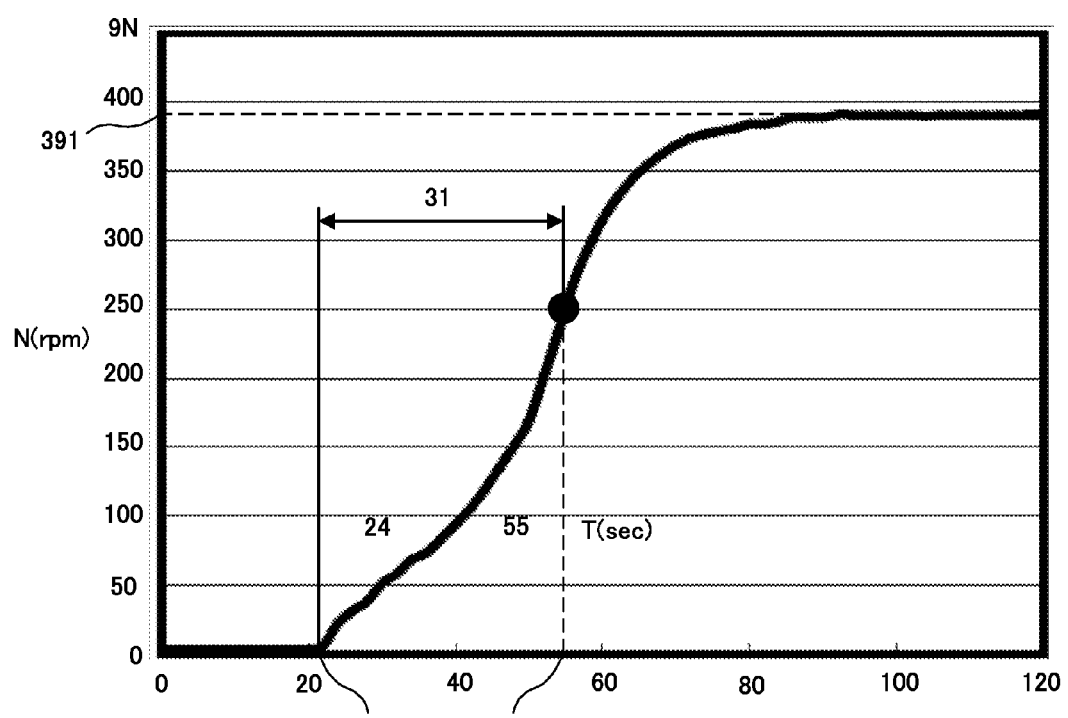
FIG. 25 is a graph showing changes over time of the number of rotations of the wind turbine according to the third embodiment of the present invention.
Figure 26:
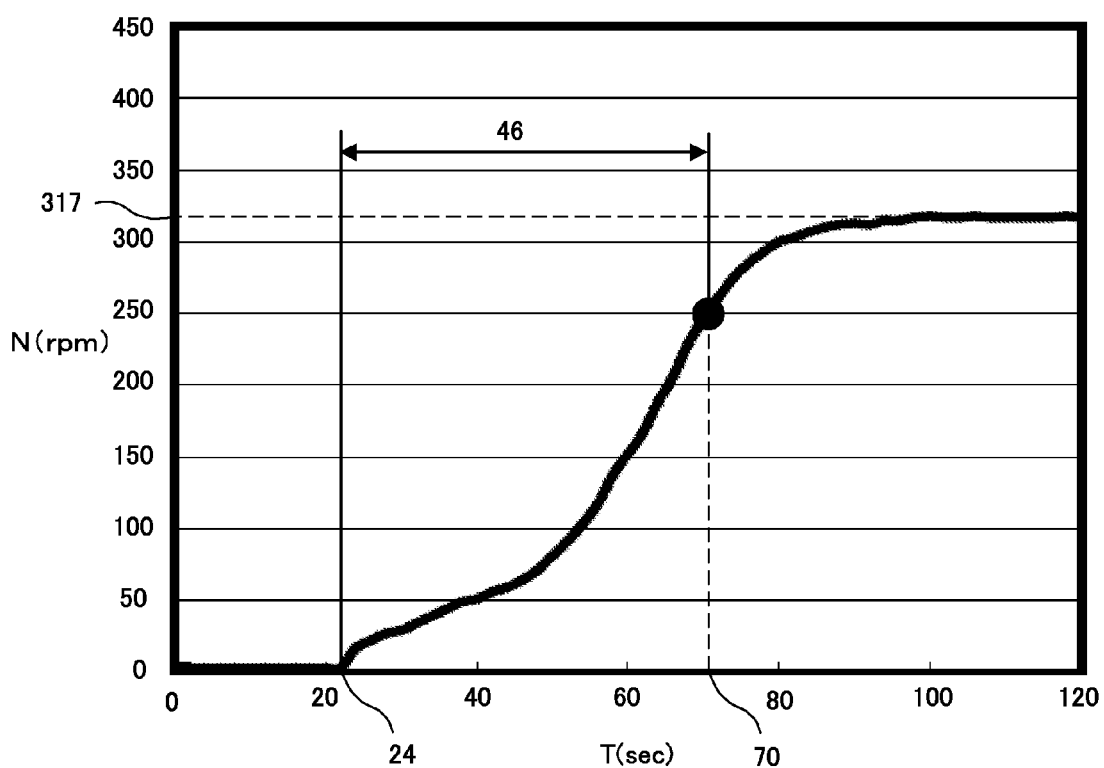
FIG. 26 is a graph showing changes over time of the number of rotations of the wind turbine according to the fourth embodiment of the present invention.
Figure 27:
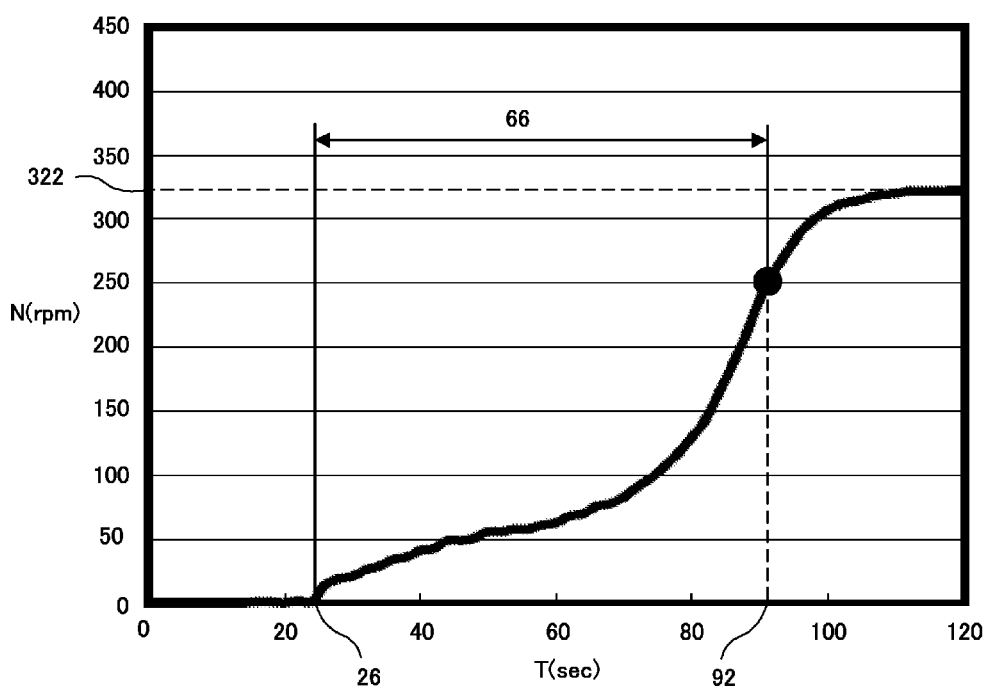
FIG. 27 is a graph showing changes over time of the number of rotations of the wind turbine according to the fifth embodiment of the present invention.

FIG. 22 is a graph illustrating changes of the number of rotations N (rpm) with passage of time t (sec) in a case where the wind having velocity changes as shown in FIG. 21 blows against a perpendicular type wind turbine in a stopped state to start. FIGS. 23-27 are graphs illustrating changes of the number of rotations N (rpm) with passage of time t (sec) in cases where the wind having velocity changes as shown in FIG. 21 blows against spherical type wind turbines according to the first to fifth embodiments in a stopped state to start.

Comparing FIGS. 22-27 with each other, if saturated values of the number of rotations N (the maximum number of rotations N) of total six types of sphere type wind turbines 20 according to the first to fifth embodiments and a perpendicular type wind turbine are arranged in an descending order, the wind turbine 20 according to the first embodiment comes first and then, followed by the wind turbine 20 according to the second embodiment, the wind turbine 20 according to the third embodiment, the wind turbine 20 according to the fifth embodiment, the wind turbine 20 according to the fourth embodiment and the perpendicular type wind turbine. That is, among the six types wind turbines 20, the result shows that the number of rotations N of the wind turbine 20 according to the first embodiment (lift force type, without wind receptor 15) is the highest, and the number of rotations N of the perpendicular type wind turbine is the lowest.

Moreover, the start up time T (sec) of the wind turbines 20 according to the first to fifth embodiments are almost the same and the perpendicular type wind turbine takes longer time to begin to rotate.

When the saturated time of the number of rotations N is arranged in an ascending order, the wind turbine 20 according to the third embodiment comes first and then, followed by the wind turbine 20 according to the second embodiment, the wind turbine 20 according to the first embodiment, the wind turbine 20 according to the fourth embodiment, the wind turbine 20 according to the fifth embodiment and the perpendicular type wind turbine.

In this way, for any of the above mentioned items, the sphere type wind turbines 20 according to the first to fifth embodiments could obtain better results than a perpendicular type wind turbine. As the results mentioned above are results obtained under predetermined conditions, if conditions are changed, the order may be changed among the wind turbines 20 according to the first to fifth embodiments.

In addition, the wind power generating systems according to the first to fifth embodiments have 3 blades 10 attached to the wind turbines 20. However, the number of blades is not limited to 3 but may be 2 or 4. Moreover, the size and/or weight of the wind power generating system 30, the wind turbine 20 and the blades 10 may be suitably changed depending on materials and the environment of arranged positions and the like explained in the first to fifth embodiments. The characteristics of the wind turbine 20 vary with these changes.

As mentioned above, although the embodiments of the present invention were explained, the present invention is not limited to the above-mentioned embodiments. The present invention includes, for example, inventions in which embodiments are changed or combined in ranges that do not change the scope of inventions.

What is claimed is:

1. A blade that rotates around a rotating shaft, to advance toward a travelling direction using a lift force generated by wind when being connected to the rotating shaft, the blade comprising:
    a first blade surface which is arranged facing an outside in the direction of radius of rotation when being connected to the rotating shaft;
    a second blade surface which forms a reverse surface of the first blade surface and which is arranged facing the rotating shaft when being connected to the rotating shaft;
    a front edge portion connected to a front end of the first blade surface and a front end of the second blade surface and formed in a curved shape convex toward the travelling direction; and
    a back edge portion connected to a back end of the first blade surface and a back end of the second blade surface, extending toward the opposite of the travelling direction, and formed in an acute angle,
    wherein, when being connected to the rotating shaft, both ends of the blade are connected to the rotating shaft, and the blade is curved to form in an arc which substantially forms a semicircle viewed from a side of the travelling direction,
    the first blade surface has a wind receptor which is concave toward the second blade surface and is arranged on the first blade surface, and
    the wind receptor comprises:
        an outer surface having two ends and being substantially parallel to the second blade surface,
        two side wall surfaces being positioned along the travelling direction and substantially perpendicular to the second blade surface, with one side wall surface connecting one end of the outer surface, and the other side wall surface connecting the other end of the outer surface along the traveling direction of the outer surface, and
        a front wall surface being positioned on the side of a front end portion of the outer surface and the two side wall surfaces, and formed in the shape of a curved surface which is convex toward the travelling direction.

2. The blade according to claim 1, wherein, viewing from the travelling direction, the blade is formed in the shape of a semicircle so that the length along the travelling direction from each of both ends toward the center becomes gradually longer.

3. The blade according to claim 1, wherein a step is formed on the first blade surface so that the distance between the surface of the step on the front edge portion side and the second blade surface is greater than the distance between the surface of the step on the back edge portion side and the second blade surface; wherein a surface of the step that connects the surface of the step on the front edge portion side and the surface of the step on the back edge portion side is facing the back edge portion side.

4. The blade according to claim 3, wherein the surface of the step is formed to have a concave surface being concave toward the front edge portion.

5. The blade according to claim 3, wherein a back edge plate extending in the opposite direction of the travelling direction is arranged on the first blade surface side of the back edge portion.

6. A wind turbine in which the blade according to claim 1 is arranged such that the blade is rotatable around the rotating shaft and the first blade surface is arranged facing the outside toward the direction of radius of rotation.

7. A wind power generating system comprising the wind turbine according to claim 6 and a generator that generates electricity by rotating the wind turbine.

* * * * *